(12) United States Patent
Duncan et al.

(10) Patent No.: US 11,329,460 B2
(45) Date of Patent: May 10, 2022

(54) METHOD FOR TRIMMING CABLE SHIELD

(71) Applicant: The Boeing Company, Chicago, IL (US)

(72) Inventors: Grace L. Duncan, Seattle, WA (US); Bradley J. Mitchell, Snohomish, WA (US); Nick S. Evans, Lynnwood, WA (US); Damien O. Martin, Everett, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/195,482

(22) Filed: Nov. 19, 2018

(65) Prior Publication Data
US 2020/0161843 A1 May 21, 2020

(51) Int. Cl.
*H02G 1/12* (2006.01)
*H01B 13/06* (2006.01)
(Continued)

(52) U.S. Cl.
CPC ........... *H02G 1/1273* (2013.01); *H01R 43/28* (2013.01); *H01B 13/062* (2013.01);
(Continued)

(58) Field of Classification Search
CPC ...... H02G 1/12; H02G 1/1212; H02G 1/1246; H02G 1/1256; H02G 1/1265; H02G 1/127;
(Continued)

(56) References Cited

U.S. PATENT DOCUMENTS 2,929,285 A * 3/1960 Gulemi ................ H02G 1/1273
81/9.51
2,988,940 A * 6/1961 Folkenroth et al. . H02G 1/1273
81/9.51
(Continued)

FOREIGN PATENT DOCUMENTS

EP 1096628 A1 5/2001

OTHER PUBLICATIONS

Extended European Search Report dated Apr. 15, 2020 in European Patent Application No. 19210066.7 (European counterpart to the instant U.S. patent application).
(Continued)

*Primary Examiner* — Clark F Dexter
(74) *Attorney, Agent, or Firm* — Ostrager Chong Flaherty & Broitman P.C.

(57) ABSTRACT

A shield trim is performed by tearing bunched shield strands circumferentially along a circular edge. The apparatus includes a pair of aligned metal plates that have been drilled through multiple times such that holes of varying diameters pass through both plates. A cable gripper on the entry side of the device clamps the cable in place. A shield gripper on the rear side of the device closes over the exposed shielding of the cable, and the two plates are pushed together. The shield gripper travels with the rear plate, pushing the shield over the wires and causing the shield to bunch between the two plates. With the two plates pushed together, both grippers open and the cable is pulled free from the device. This pull forces a stress concentration which tears the shield strands across the sharp edge of the hole, producing a uniformly trimmed shield.

21 Claims, 25 Drawing Sheets

(51) Int. Cl.
    *H01R 43/28*     (2006.01)
    *H01R 4/72*     (2006.01)
    *H01R 43/02*     (2006.01)

(52) U.S. Cl.
    CPC ............ *H01B 13/067* (2013.01); *H01R 4/723* (2013.01); *H01R 43/02* (2013.01); *Y10T 225/10* (2015.04); *Y10T 225/357* (2015.04)

(58) Field of Classification Search
    CPC .... H02G 1/1273; H02G 1/1297; H01R 43/28; Y10T 29/49123; Y10T 225/10; Y10T 225/30; Y10T 225/35; Y10T 225/357; Y10T 225/393
    USPC .......... 29/828; 81/9.51; 225/1, 93, 100, 101, 225/106
    See application file for complete search history.

(56) References Cited

U.S. PATENT DOCUMENTS

| | | | | |
|---|---|---|---|---|
| 3,044,333 A * | 7/1962 | Broske | ................ | H02G 1/1273 30/90.1 |
| 3,139,778 A * | 7/1964 | Bielinski et al. | .... | H02G 1/1212 81/9.51 |
| 3,153,358 A * | 10/1964 | Havens | ................ | H02G 1/1256 81/9.51 |
| 3,171,306 A * | 3/1965 | Mirsch | ................... | H02G 1/127 81/9.51 |
| 4,685,636 A | 8/1987 | Eaton | | |
| 4,763,410 A * | 8/1988 | Schwartzman | ...... | H02G 1/1212 29/828 |
| 5,072,632 A * | 12/1991 | Sayyadi | ............... | H02G 1/1265 81/9.51 |
| 5,074,169 A * | 12/1991 | Matz | ..................... | H02G 1/127 81/9.51 |
| 5,125,154 A | 6/1992 | Cross | | |
| 5,152,395 A | 10/1992 | Cross | | |
| 6,330,839 B1 * | 12/2001 | Amrein | ................ | H02G 1/1273 29/828 |
| 6,857,550 B2 | 2/2005 | Wright et al. | | |
| 7,228,625 B1 * | 6/2007 | Zerebilov | ............. | H01R 9/032 174/34 |
| 7,513,357 B2 | 4/2009 | Abbestam et al. | | |
| 8,430,229 B2 | 4/2013 | Abbestam | | |
| 8,739,964 B2 | 6/2014 | Ek | | |
| 8,794,432 B2 | 8/2014 | Ek | | |
| 9,612,210 B2 | 4/2017 | Ray et al. | | |
| 9,966,742 B2 | 5/2018 | Evans et al. | | |
| 10,587,101 B2 * | 3/2020 | Martin et al. | ........ | H02G 1/1256 |
| 2001/0023148 A1 * | 9/2001 | Lamatsch et al. | ..... | H01R 9/034 439/579 |
| 2011/0266274 A1 | 11/2011 | Ebata et al. | | |
| 2016/0036208 A1 * | 2/2016 | Evans et al. | ......... | H02G 1/1256 83/56 |
| 2018/0287353 A1 * | 10/2018 | Martin et al. | ........ | H02G 1/1256 |

OTHER PUBLICATIONS

Communication dated Mar. 17, 2021 in European Patent Application No. 19210066.7 (European counterpart to the instant U.S. patent application).

* cited by examiner

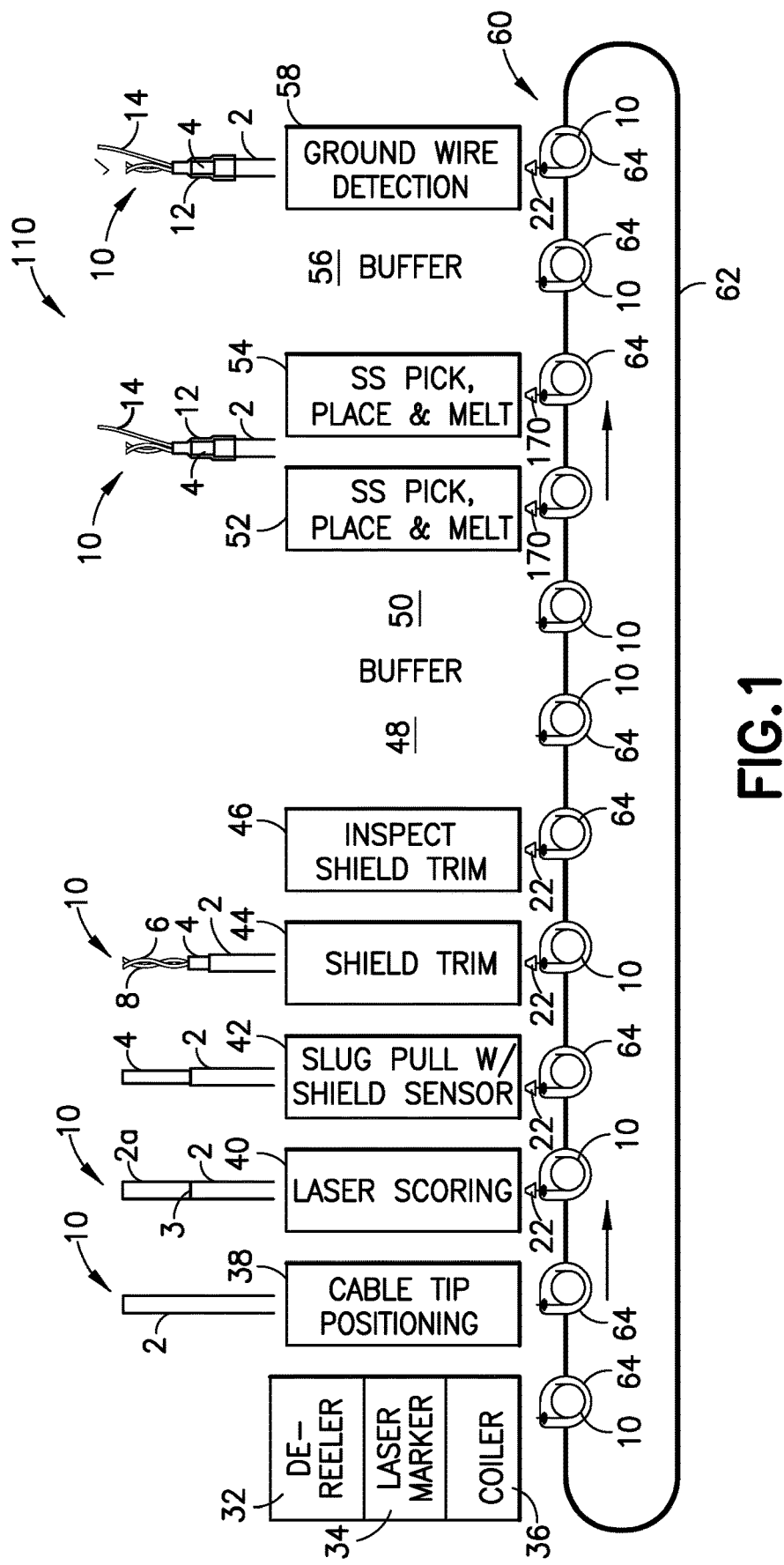

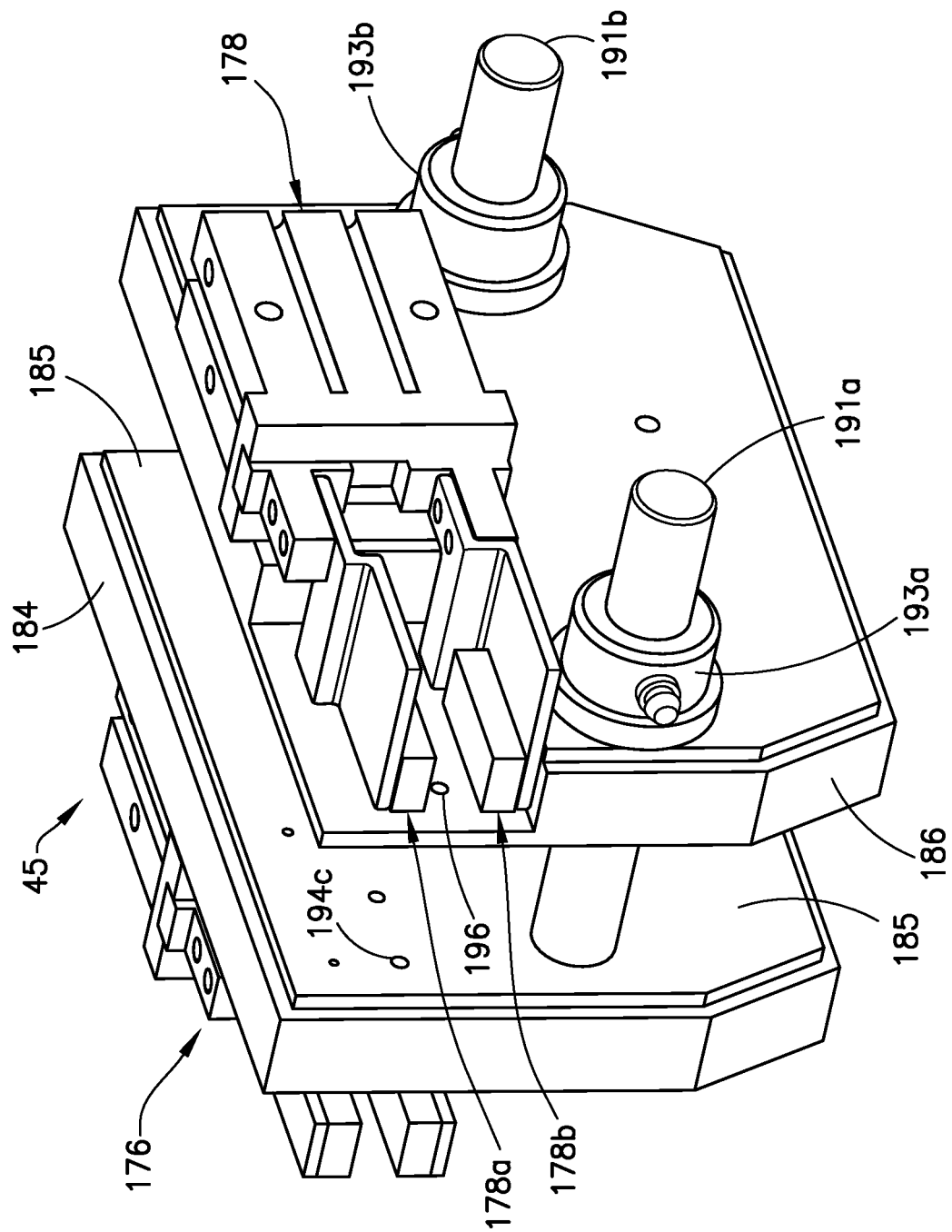

METHOD FOR TRIMMING CABLE SHIELD

BACKGROUND

This disclosure generally relates to apparatus and methods for processing shielded cable. In particular, this disclosure relates to apparatus and methods for trimming exposed shielding in a shielded cable.

Shielded cables incorporate shielding in an attempt to prevent electromagnetic interference. For example, the conductors may be surrounded by braided shielding made of metal. Because the shielding is made of metal, it may also serve as a path to ground. Usually a shielded cable incorporates a grounding wire that contacts the shield in an unjacketed portion of the shielded cable. Typically the grounding wire is attached to the unjacketed portion using a solder sleeve.

Currently, the process of trimming an exposed shield of a shielded cable is a mostly manual and labor-intensive process. The shield trimming process is performed prior to installing solder sleeves onto shielded cables. One current method for trimming the exposed shield is to manually bunch the shield together such that it balloons out circumferentially, and then trim the bunched shield strands using a diagonal cutter. This process is slow, labor-intensive, and risks nicking or otherwise damaging the cable.

SUMMARY

The subject matter disclosed in some detail below is directed to providing semi-automated (with manual feeding) and fully automated (with automated feeding) solutions for trimming the shield on an unjacketed portion of a shielded cable. The automation of the shield trimming operation enables repeatable and consistent quality across end products that is unachievable with a fully manual process. The proposed method and apparatus for trimming the shield on an unjacketed portion of a shielded cable eliminate the need for any blades by performing the trim via a circumferential tear. Because the apparatus does not use sharp blades, there is no risk to the cable or the conductors. In addition, the cycle time for the shield trimming operation may be reduced.

In accordance with one embodiment disclosed below, the shield trim is performed by tearing bunched shield strands circumferentially along a circular edge. The apparatus includes a pair of aligned metal plates that have been drilled through multiple times such that holes of varying diameters may be passed through both plates. A cable to be processed is fed through the hole of best fit, that is, a hole that is just large enough for the cable to pass through without snagging the shield. Once the cable has been fed such that it is in a position to produce a trim at the desired length, a cable gripper on the entry side of the device clamps the cable in place. A shield gripper on the rear side of the device closes over the exposed shielding of the cable, and the two plates are pushed together. The shield gripper travels with the rear plate, pushing the shield over the wires and causing the shield to bunch between the two plates. With the two plates pushed together, both grippers open and the cable is pulled free from the device. This pull forces a stress concentration on the shield strands as they are pulled and subsequently torn across the sharp edge of the hole, producing a uniformly trimmed shield. This process is largely automated, and requires little manual labor to use. The operator simply has to insert and remove the cable from the device.

The apparatus disclosed herein may be adapted for use on a benchtop or incorporated in an automated production line that includes a cable delivery system and a multiplicity of workstations accessible to the cable delivery system. In the automated production line, each workstation is equipped with a respective cable processing module (including hardware and software) that performs a respective specific operation in a sequence of operations designed to produce a shielded cable having a solder sleeve installed on one end of the cable. One of the workstations has the shield trimming apparatus disclosed in detail below.

Although various embodiments of methods and apparatus for trimming the shield on an unjacketed portion of a shielded cable will be described in some detail below, one or more of those embodiments may be characterized by one or more of the following aspects.

One aspect of the subject matter disclosed in detail below is a method for trimming a shield in an unjacketed portion of a cable, the shield having first and second exposed shield portions connected by a third exposed shield portion. The method comprises: placing the first exposed shield portion inside a first hole having a hole edge; placing the second exposed shield portion inside a second hole; moving the second exposed shield portion toward the first exposed shield portion in a manner that causes the third exposed shield portion to bunch radially outward around an entire periphery of the shield; and tearing the shield in a circumferential region where the third exposed shield portion connects to the first exposed shield portion using the hole edge of the first hole while the third exposed shield portion is bunched radially outward and the second exposed shield portion is not moving toward the first exposed shield portion.

The method described in the immediately preceding paragraph may further comprise: pinching the third exposed shield portion which is bunched radially outward; moving the first exposed shield portion away from the second exposed shield portion while the third exposed shield portion is being pinched; and moving the first exposed shield portion away from the second exposed shield portion comprises rotating a pair of wheels in a cable pulling direction while the jacketed portion of the cable is disposed in a nip between the pair of wheels.

Another aspect of the subject matter disclosed in detail below is a method for trimming a shield of a shielded cable, comprising: (a) placing an unjacketed portion of a shielded cable so that an exposed shield passes through a first hole that intersects a first surface at a hole edge and a second hole that intersects a second surface that confronts the first surface, and projects out of the second hole; (b) after completion of step (a), gripping a jacketed portion of the shielded cable; (c) moving the second hole away from the first hole while the gripped jacketed portion does not move; (d) after completion of step (c), gripping a portion of the exposed shield that projects out of the second hole; (e) while the gripped jacketed portion of the shielded cable is stationary, moving the gripped portion of the exposed shield in a first direction until a bunched portion of the exposed shield is pinched between the first and second surfaces; and (f) after completion of step (e) and while the bunched portion of the exposed shield is pinched between the first and second surfaces, moving the jacketed portion of the shielded cable in the first direction so that the portion of the exposed shield that was inside the first hole tears away along the hole edge from the bunched portion of the shield. This moving could be accomplished by rotating a drive roller in a cable pulling direction, by moving the gripper that was holding onto the jacketed portion if the gripper were on an actuator, or manually by pulling on the cable.

A further aspect of the subject matter disclosed in detail below is an apparatus for trimming a shield of a shielded cable, the apparatus comprising: a first press die having a first hole with a hole edge at an intersection with a first surface of the first press die; a second press die having a second hole that intersects a second surface of the second press die and is aligned with the first hole, the second press die being translatable relative to the first press die between a first position in contact with the first press die and a second position away from and not in contact with the first press die; a first gripper mounted to the first press die such that the first press die is disposed between the first gripper and the second press die; and a second gripper mounted to the second press die such that the second press die is disposed between the first press die and the second gripper. The hole edge is made of tool steel or another metal that has been heat treated, cold worked, or processed in some other way to increase the hardness of the metal.

In accordance with one embodiment, the apparatus further comprises: a first actuator for alternatingly moving the second press die between the first and second positions in response to control signals; a second actuator for alternatingly opening and closing the cable gripper in response to control signals; a third actuator for alternatingly opening and closing the shield gripper in response to control signals; and a computer system programmed to generate control signals that cause the second press die to move from the second position to the first position while the cable gripper and shield gripper are closed.

Yet another aspect is a system for trimming a shield of a shielded cable, the system comprising: a first press die having a first hole with a hole edge at an intersection with a first surface of the first press die; a second press die having a second hole that intersects a second surface of the second press die and is aligned with the first hole, the second press die being translatable relative to the first press die between a first position in contact with the first press die and a second position away from and not in contact with the first press die; a first gripper mounted to the first press die such that the first press die is disposed between the first gripper and the second press die; a second gripper mounted to the second press die such that the second press die is disposed between the first press die and the second gripper; a first actuator for alternatingly moving the second press die between the first and second positions; a second actuator for alternatingly opening and closing the cable gripper; a third actuator for alternatingly opening and closing the shield gripper; a drive wheel; an idler wheel arranged to form a nip with the drive wheel; a motor operatively coupled to the drive wheel; and a computer system programmed to control the first through third actuators and the motor so that: the second press die moves from the second position to the first position while the cable gripper and shield gripper are closed; and while the second press die is in the second position, the cable gripper and shield gripper are opened and the motor is driven to rotate the drive wheel in a cable pulling direction.

Other aspects of methods and apparatus for trimming the shield on an unjacketed portion of a shielded cable are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

In addition, the depiction of shielded cabling in the drawings has been simplified by assuming that the cable being viewed in the drawing has a circular outer profile of constant diameter along its length, although some shielded cabling having a jacket that conforms to the undulations in the electrical wires has an outer profile that varies along its length.

FIG. 1 is a diagram representing and identifying components of an automated system for performing respective operations on an end of a cable at a plurality of cable processing modules in accordance with one embodiment.

FIGS. 19A and 19B are diagrams representing three-dimensional front and rear views respectively of an apparatus for automated trimming of exposed shield from the end of a shielded cable in accordance with one proposed implementation.

Reference will hereinafter be made to the drawings in which similar elements in different drawings bear the same reference numerals.

DETAILED DESCRIPTION

Figure 2A:
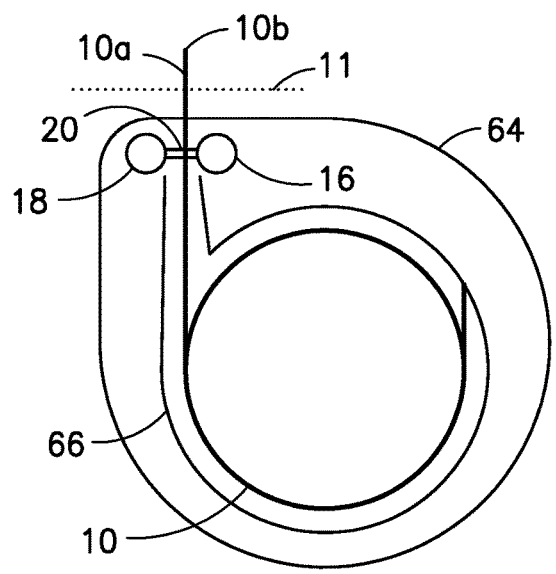
FIGS. 2A and 2B are diagrams representing top views of a cable-carrying, drive wheel-equipped pallet in two states: when the drive wheel is separated from an idler wheel (FIG. 2A) and when the drive wheel is in contact with the idler wheel (FIG. 2B).

Illustrative embodiments of methods and apparatus for trimming the shield on an unjacketed portion of a shielded cable are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

For the purpose of illustration, various embodiments of an apparatus for automatically trimming the shield on an unjacketed portion of a shielded cable will now be described. That cable processing equipment may be one of a multiplicity of modules at separate workstations in a fully automated production line or may be benchtop cable processing equipment (e.g., equipment mounted on a workbench and accessible to a human operator).

As used herein, the term "tip of a cable" means a portion of a cable exposed by cutting the cable in a cross-sectional plane. As used herein, the term "end of a cable" means a section of cable having a tip and a length of cable extending from the tip. For example, removal of a length of the jacket of a cable that extends to the cable tip creates an end of the cable in which the shielding is exposed.

As used herein, the term "sleeve" means a tube made of shrinkable material, such as a solder sleeve made of thermoplastic material (which shrinks) and a solder ring (which melts) or a dead end sleeve made of thermoplastic material and having no solder ring. Installation of a solder sleeve involves shrinking of the thermoplastic material and melting of the solder ring; installation of a dead end sleeve involves shrinking of the thermoplastic material. As used herein, "melting a solder sleeve" includes shrinking the thermoplastic material with melting of a solder ring, while "shrinking a sleeve" includes shrinking the thermoplastic material with (e.g., solder sleeve) or without (e.g., dead end sleeve) melting of a solder ring.

FIG. 1 is a diagram representing and identifying components of a system 110 for performing respective operations on an end of a shielded cable 10. The system 110 includes a cable delivery system 60. For example, the cable delivery system 60 may take the form of a conveyor system with locating modules (not shown in FIG. 1). Locating modules are components for positioning pallets in preparation for performance of an automated operation. In accordance with the embodiment depicted in FIG. 1, the cable delivery system 60 includes a conveyor track 62 in the form of an endless belt or chain. The entire conveyor track 62 is continuously moving. In alternative embodiments, the cable delivery system 60 is not endless, in which case pallets 64 arriving at the end of a linear conveyor track may be transported to the starting point by other means. In accordance with alternative embodiments, the cable delivery system 60 may be a gantry robot or a robotic arm.

The system 110 depicted in FIG. 1 further includes a multiplicity of automated workstations situated adjacent to and spaced at intervals along the conveyor track 62. Each workstation is equipped with hardware that performs a respective specific operation in a sequence of operations designed to produce a shielded cable 10 having a solder sleeve 12 installed on one end of the cable 10. The locating modules (not shown in FIG. 1) of the system 110 are used to lift each pallet 64 off of the conveyor track 62 when an operation has to be performed at a workstation on the coil carried by that pallet 64 and later place the pallet 64 back on the conveyor track 62 after the operation has been completed so that the pallet 64 can move onto the next workstation.

Each pallet 64 carries a respective coil of cable 10. Pallets 64 move intermittently along the conveyor track 62 in the forward direction indicated by the arrows in FIG. 1, advancing from one automated workstation to the next and then stopping. (This aspect of the cable delivery system 60 will be referred to hereinafter as "pulsing".) A respective bar code reader (not shown in the drawings) is mounted on the side of the conveyor track 62 opposite to each workstation. Each pallet 64 has a bar code printed on a forward side portion thereof. When the bar code reader detects the arrival of a pallet 64, each workstation has a respective controller (e.g., a computer programmed to execute computer numeric control (CNC) commands) that activates the cable processing module of that workstation to begin an automated cable processing operation.

Each shielded cable 10 to be processed is carried on a respective pallet 64 that is conveyed along the conveyor track 62. The pallets 64 pulse down the conveyor track 62 and the end of each shielded cable 10 is inserted into a series of cable processing modules in sequence, each cable processing module including cable processing equipment for performing successive operations of a solder sleeve installation process. In accordance with the embodiment depicted in FIG. 1, the cable processing modules include the following: a de-reeler module 32, a laser marker 34, a coiler module 36, a cable tip positioning module 38, a laser scoring module 40, a jacket slug pulling module 42, a shield trimming module 44, a shield trim inspection module 46, two solder sleeve installation modules 52 and 54 (also referred to herein as "solder sleeve pick, place and melt modules"), and a ground wire detection module 58. In accordance with the proposed implementation depicted in FIG. 1, there are three open positions where cable processing does not occur. These open positions, where a pallet may be parked, are referred to herein as buffers 48, 50 and 56.

As indicated in FIG. 1 by triangle symbols, some of the workstations include funnels 22 which center the inserted end of the cable 10 in the cable processing equipment at the respective workstation. Other workstations, such as the workstation where the cable tip positioning module 38 is located, do not have a funnel. The workstations where the two solder sleeve installation modules 52 and 54 are located have open-top or split funnels 170, which also guide the end of the cable 10, but differ in structure from the funnels 22 in that the cable may be lifted vertically out of the open or split funnel 170 upon completion of the solder sleeve melting operation.

Each of the automated cable processing operations identified in FIG. 1 will now be briefly described in some detail. The respective cable processing modules will be described in the order in which the respective cable processing operations are performed on one cable.

The starting material is a continuous length of multi-conductor shielded cable of a particular type wound on a reel. The de-reeler module 32 de-reels the continuous length of cable and then cuts the cable to a specified length, which length of cable will be referred to hereinafter as "cable 10". Preferably a multi-spool de-reeler is used so that multiple cable types can be selected for processing off of a single machine. For each length of cable 10, the laser marker 34 laser marks an outer jacket 2 of the cable 10 with pertinent information (bundle number, wire number, gauge).

The coiler module 36 receives each length of cable 10 from the de-reeler module 32 and laser marker 34 and coils the cable 10. This creates a repeatable configuration for the cable that is easy to transport and maintain as it goes through the system. The coiler module 36 coils cables 10 and applies a sticker label. This label contains information about the cable (airplane effectivity, bundle, dash, wire identification, etc.), as well as a bar code. In accordance with one proposed implementation, the coiler module 36 ensures that one end of the coiled cable 10 has seven inches of "free" cable.

The coil of cable 10 is taken off of the coiler and placed on a pallet 64. The pallet 64 is then transferred from the coiler module 36 to the cable tip positioning module 38. This may be done manually by an operator or automatically by a robotic end effector (or some other apparatus).

The cable tip positioning module 38 serves to initially position the tip of the cable 10 at a preset cable tip position prior to the cable 10 continuing through the system 110. It is the first "stop" along the conveyor track 62, and is where the cable 10 is first placed onto the system. The preset cable tip position is selected to prevent the cable end from being too long as it travels along the conveyor track (hitting other objects within the system, being crushed or otherwise damaged, etc.). After the cable tip positioning module 38 has positioned the cable tip 10b at the preset cable tip position, the pallet 64 leaves the cable tip positioning module 38.

In accordance with the embodiment depicted in FIG. 1, after the cable tip positioning module 38 has positioned the cable tip 10b, the pallet 64 moves to the laser scoring module 40. The workstation where the laser scoring module 40 is located also includes a funnel 22 for guiding a cable 10 into the cable processing equipment of the laser scoring module 40. The laser scoring module 40 lightly scores the jacket 2 of the cable 10 along a score line 3 which extends circumferentially in a plane that intersects an annular region of the jacket 2. The presence of the laser score line 3 prepares the applicable segment of jacket 2 (hereinafter "the jacket slug 2a") to be removed.

After the laser scoring module 40 has scored the jacket 2 of the cable 10, the pallet 64 moves to the jacket slug pulling module 42. The workstation where the jacket slug pulling module 42 is located also includes a funnel 22 for guiding a cable 10 into the cable processing equipment of the jacket slug pulling module 42. The jacket slug pulling module 42 removes the jacket slug 2a to reveal the shield 4 in the unjacketed portion of the cable 10. An electrical continuity shield sensor (not separately depicted in FIG. 1) may be integrated with the jacket slug pulling module 42 to detect that the jacket slug 2a was removed prior to retracting the cable 10 from the jacket slug pulling module 42.

After the jacket slug pulling module 42 has pulled off the jacket slug 2a of the cable 10, the pallet 64 moves to the shield trimming module 44. The workstation where the shield trimming module 44 is located also includes a funnel 22 for guiding a cable 10 into the cable processing equipment of the shield trimming module 44. The shield trimming module 44 trims off a portion of the exposed portion of the shield 4 to reveal respective portions of wires 6 and 8 of the cable 10. In accordance with one proposed implementation, the shield trimming module 44 trims the shield 4 of the cable 10 about 0.25" from the edge of the jacket 2.

After the shield trimming module 44 has trimmed the shield 4 of the cable 10, the pallet 64 moves to the shield trim inspection module 46. The workstation where the shield trim inspection module 46 is located also includes a funnel 22 for guiding a cable 10 into the cable processing equipment of the shield trim inspection module 46. The shield trim inspection module 46 performs a quality check of the trimmed shield using a vision inspection system. The quality check ensures that the shield 4 meets the specifications for the particular type of cable 10 (e.g., shield strands are not too long or too short, not damaged, etc.) prior to installing a solder sleeve 12.

After the shield trim inspection module 46 has inspected the trimmed shield 4 of the cable 10, the pallet 64 moves to one of two solder sleeve installation modules 52 and 54. The workstations where the solder sleeve installation modules 52 and 54 are located also include an open-top funnel 170 for guiding a cable 10 into the cable processing equipment of the solder sleeve installation modules 52 and 54. The solder sleeve installation modules 52 and 54 are configured to install a solder sleeve 12 with a ground wire 14 onto the cable 10 using automated picking, placing and melting operations. Each solder sleeve installation modules preferably includes a sensor system that actively measures the diameter of the cable with the solder sleeve and monitors the shrinking diameter of the solder sleeve during the melting process using dimensional analysis. The sensor system activates or deactivates the heating element based on the dimensional analysis of the solder sleeve; this may also control the transportation of the cables through the device.

Solder sleeves are limited in how quickly they are able to fully melt without burning due to their design and materials. The type of heat source used (hot air, infrared) has no significant impact on the melt time. This creates a bottleneck on the moving line, due to the fact that all processes prior to the solder sleeve melting operation take much less time to complete, and limits the lowest achievable cycle time of the overall line.

In accordance with one proposed implementation, two cables 10 may have solder sleeves installed concurrently using the two solder sleeve installation modules 52 and 54. After the solder sleeve 12 has been installed on the cable 10 by one of the solder sleeve installation modules 52 and 54, the pallet 64 moves to ground wire detection module 58. The workstation where the ground wire detection module 58 is located also includes a funnel 22 for guiding a cable 10 into the cable processing equipment of the ground wire detection module 58. The ground wire detection module 58 detects the ground wire 14 of the solder sleeve 12. This may be done through physical sensing or an electrical continuity test, all of which are commercially available off the shelf.

As seen in FIG. 1, the cable delivery system 60 includes multiple pallets 64 that travel on the conveyor track 62, each pallet 64 carrying a respective coil of cable 10. In accordance with some embodiments, the apparatus on the pallet 64 includes a pair of cable-displacing wheels (e.g., a motor-driven drive wheel and a spring-loaded idler wheel that is movable between positions that are respectively in contact with and not in contact with the motor-driven drive wheel) designed to push and pull cables through a cable-guiding funnel which centers the cable for insertion into the cable processing equipment. The ability of the drive and idler wheels to move apart enables wires or cables of varying diameters and cross-sectional profiles to be placed between the drive and idler wheels. This apparatus is intended to be universal, i.e., to be able to be used on any equipment (including benchtop equipment) that processes wires and/or cables. Additionally, a user would be able to define the amount (length) of cable that is fed into the equipment, depending on the cable that is to be processed and its related requirements.

Figure 2B:
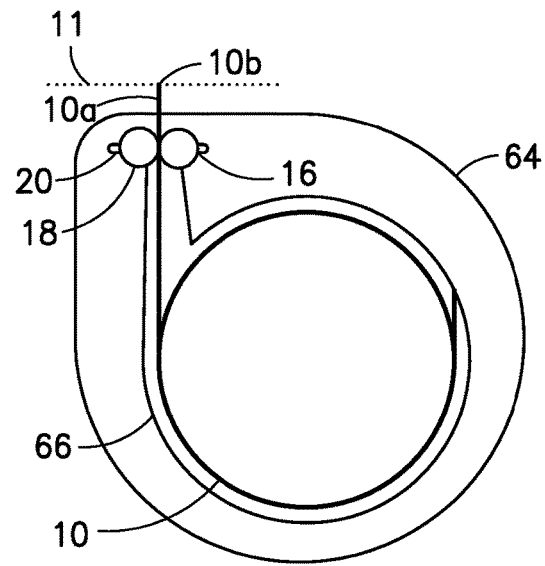

Some features of a pallet 64 in accordance with one embodiment will now be described with reference to FIGS. 2A and 2B; other features of the pallet 64 not shown in FIGS. 2A and 2B will be described later with reference to other drawings. As seen in FIGS. 2A and 2B, each pallet 64 has a drive wheel 16 and an idler wheel 18 which are rotatably coupled to the pallet 64. The drive wheel 16 and idler wheel 18 are preferably padded with a compliant material capable of conforming to different cross-sectional profiles (e.g., single- versus multi-conductor cable). An encoder may be attached to one or both of the wheels in order to more accurately track how far the cable 10 has been moved by the wheels. The encoder tracks the "distance traveled" of a drive roller by multiplying the number of rotations by the circumference of the drive wheel 16.

The pallet 64 also includes a corral 66 in the form of a curved wall that is contoured to guide the cable end 10a toward the drive wheel 16 and idler wheel 18. The drive wheel 16 and idler wheel 18 cooperate to move the cable end 10a into and out of an adjacent cable processing module 30. FIGS. 2A and 2B show the pallet 64 in two states: when the drive wheel 16 is separated from the idler wheel 18 (FIG. 2A) and when the drive wheel 16 is in contact with the idler wheel 18 (FIG. 2B).

As seen in FIG. 2A, the free end 10a of the cable 10 is placed between the drive wheel 16 and idler wheel 18 so that the cable tip 10b is at a position in front of the nip between the wheels 16, 18, while the cable 10 is intersected by a vertical scanning plane 11 (indicated by a dashed line in FIGS. 2A and 2B) located at a known position. This known position is a known distance from a preset cable tip position. Although FIG. 2A shows the cable tip 10b located beyond the vertical scanning plane 11, the starting position of the cable tip 10b may be either beyond or short of the vertical scanning plane 11.

The force holding the idler wheel 18 apart from drive wheel 16 is then discontinued, following which the idler wheel 18 is urged by springs (not shown in FIGS. 2A and 2B) into contact with the drive wheel 16, thereby forming a nip that squeezes the shielded cable 10. As will be described in further detail below, the drive wheel 16 and idler wheel 18 are configured so that sufficient frictional forces are produced that enable the shielded cable 10 to be either pushed or pulled through the nip depending on the directions of wheel rotation. Upon detection of the presence of the cable tip 10b at a position beyond the vertical scanning plane 11, the drive wheel 16 and idler wheel 18 are rotated in a cable pulling direction to cause the cable end 10a to retract and the cable tip 10b to move toward the vertical scanning plane 11. Conversely, if the cable tip 10b were at a position short of the vertical scanning plane 11 (hereinafter "scanning plane 11"), the drive wheel 16 and idler wheel 18 would be rotated in a cable pushing direction to cause the cable end 10a to extend and the cable tip 10b to move toward the scanning plane 11. The remainder of the description of FIGS. 2A and 2B will discuss the case wherein the cable end 10a is initially placed in a position such that the cable tip 10b is beyond (not short of) the scanning plane 11

The movement of the cable tip 10b is monitored by detecting when the cable tip 10b reaches the scanning plane 11. In one embodiment, this may be accomplished by a photoelectric sensor (not shown in FIGS. 2A and 2B, but see photoelectric sensor 28 in FIGS. 4A and 4B) mounted to the pallet 64 and configured to function as a light gate. In accordance with some embodiments, the photoelectric sensor 28 is configured to act as a light gate that detects when there is no portion of the cable 10 blocking a light beam propagating in the scanning plane 11 from one side of the light gate to the other side. FIG. 2B shows the state wherein the cable tip 10b is aligned with the scanning plane 11 following retraction of the cable end 10a. In response to the photoelectric sensor 28 detecting a transition between a state of light being interrupted (e.g., blocked) in the scanning plane 11 and a state of light not being interrupted, the photoelectric sensor 28 issues a cable tip position signal indicating the transition between interruption and no interruption of transmitted light at the scanning plane. In response to issuance of the cable tip position signal, the computer of the cable positioning module activates a motor (not shown in FIGS. 2A and 2B, but see motor 72 in FIGS. 4A and 4B) to rotate the drive wheel 16 an amount and in a direction such that at the end of the rotation, the cable 10 does not extend beyond a preset cable tip position. This preset cable tip position is a known distance from the scanning plane 11. The preset cable tip position may be selected to ensure that the cable tip 10b may travel along the conveyor track 62 with sufficient clearance to avoid damage from stationary objects.

Figure 3:
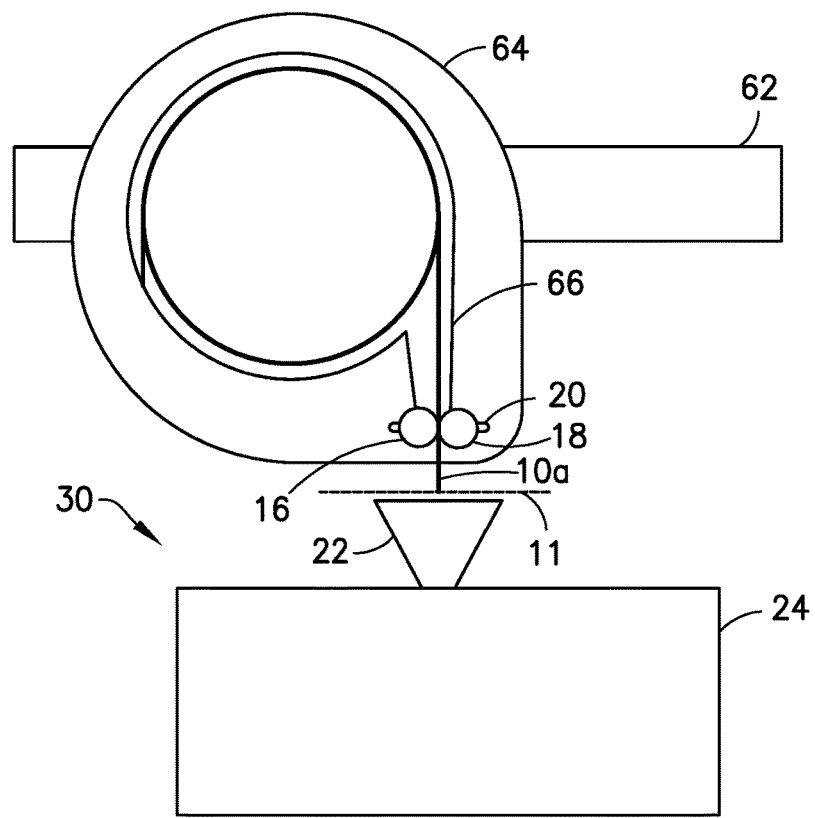
FIG. 3 is a diagram representing a top view of the pallet depicted in FIG. 2B in a position adjacent a cable processing module where a tip of the cable is positioned in front of a funnel.

The cable tip positioning module 38 includes a computer system 160 (not shown in FIG. 3). The cable tip positioning signal from the photoelectric sensor 28 is received by the computer 160. The computer 160 is configured to de-activate the motor 72 that drives rotation of the drive wheel 16 (thereby ceasing driving rotation of the drive wheel 16 in the cable pulling direction) after a predetermined angular rotation of the drive wheel 16 subsequent to issuance of the cable tip position signal. In other words, there is a time delay during which the drive wheel 16 and idler wheel 18 continue to move the cable end 10a, causing the cable tip 10b to move from the current position depicted in FIG. 2B (in this instance, corresponding to the position of the scanning plane 11) to a preset cable tip position a short distance (e.g., 0.5 inch) from the scanning plane 11. More specifically, the computer 160 is configured to start a count of pulses output by a rotation encoder (mounted on the drive wheel shaft or the motor output shaft, for example) in response to issuance of the cable tip position signal and then de-activate the motor 72 in response to the count reaching a specified value representing the distance separating the preset cable tip position from the scanning plane 11.

In accordance with an alternative embodiment, the preset cable tip position and the position of the scanning plane may be one and the same, provided that the movement of the cable 10 can be stopped precisely at the instant in time when the sensor 28 issues the cable tip position signal.

The above-described cable tip positioning process ensures that the cable tip 10b is in a repeatable position and does not extend beyond the preset cable tip position prior to continuing down the conveyor track 62. At this juncture, the conveyor track 62 pulses forward, causing the pallet to move to the next workstation.

FIG. 3 is a diagram representing a top view of the pallet 64 in a position adjacent a cable processing module 30. The apparatus includes a drive wheel 16 and an idler wheel 18 configured for driving the cable 10 forwards or backwards between the wheels and a funnel 22 capable of capturing the cable end 10a. While the wheels control the motion of the cable 10, the funnel 22 serves to center the cable 10 for insertion into cable processing equipment of the cable processing module 30. This function will be used to insert and position the cable 10 into different modules for processing as the cable 10 is transported through the system.

More specifically, the cable tip 10b is positioned in front of a funnel 22 that is configured to center a cable end 10a as it is fed into the cable processing equipment 24 of a cable processing module 30. Each cable processing module 30 is equipped with a funnel 22 (or an open-top funnel 170 shown in FIG. 1) and a cable tip detection mechanism or apparatus such as a photoelectric sensor (not shown in FIG. 3, but see photoelectric sensor 28 in FIG. 5) for detecting the presence of the cable tip 10b in a scanning plane 11 (indicated by a dashed line in FIG. 3). It is important that the interior surface of the funnel 22 be smooth and devoid of any rough or sharp edges that may abrade, tear, or otherwise damage the cable 10. Preferably the funnel 22 is made of a thermoplastic material with a low coefficient of friction to prevent the funnel 22 from slowing the cable 10 down as it is moved by the drive wheel 16 and idler wheel 18 (preventing slippage). The funnel 22 may be configured in different ways. In lieu of a basic hole on the exit side of the funnel 22 (small diameter side), the funnel 22 may have a flexible piece of material featuring an X-shaped cut centered within the funnel 22. This helps to provide a repeatable, centered position for the cable 10 as it is either pushed forward or pulled back. It also permits the cable-guiding funnel to accurately center cables with varying diameters and cross sectional profiles. Other cable-guiding funnels may also be split and/or feature an open top.

Figure 4A:
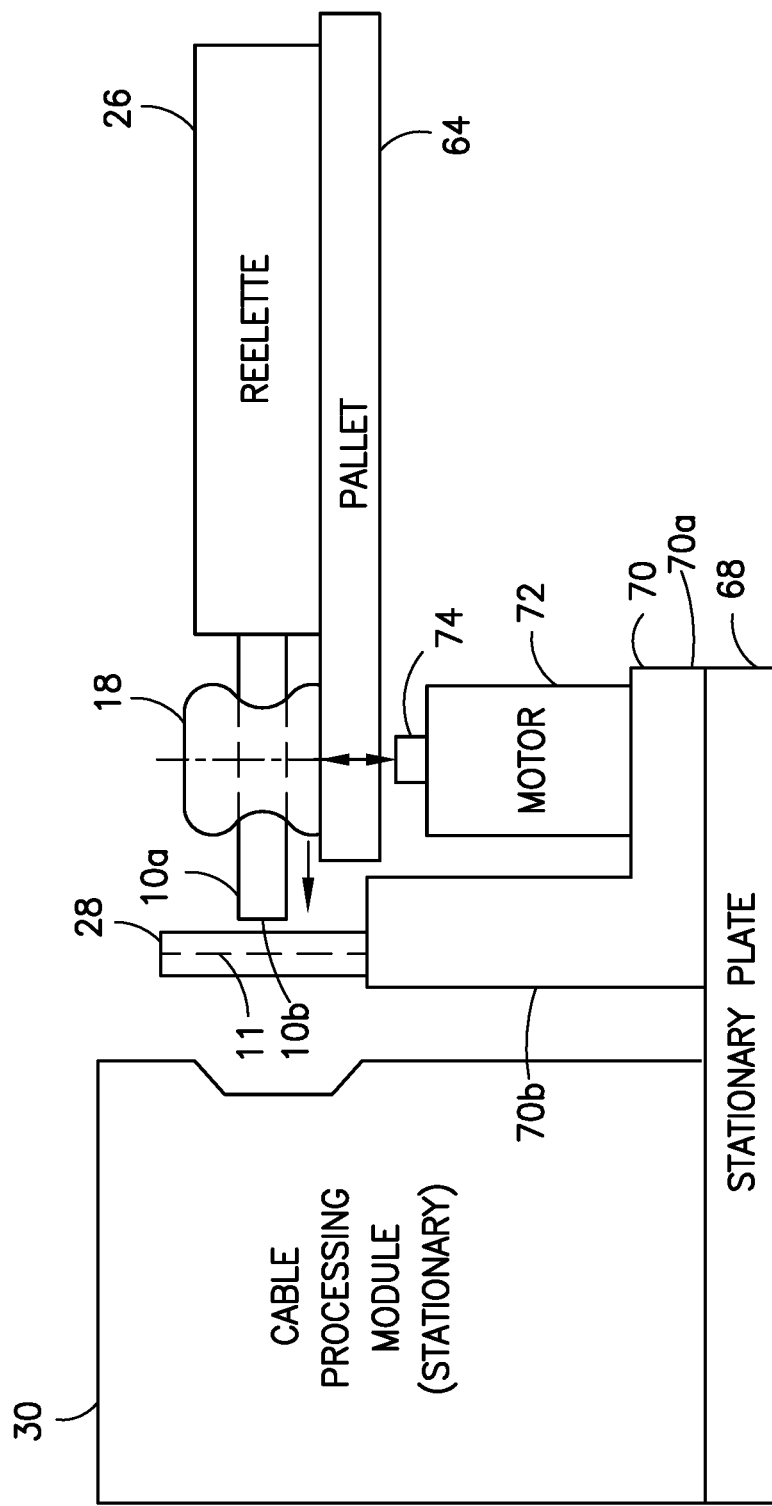
FIG. 4A is a diagram representing a side view of a cable-carrying, drive wheel-equipped pallet in a position adjacent a cable processing module.
Figure 4B:
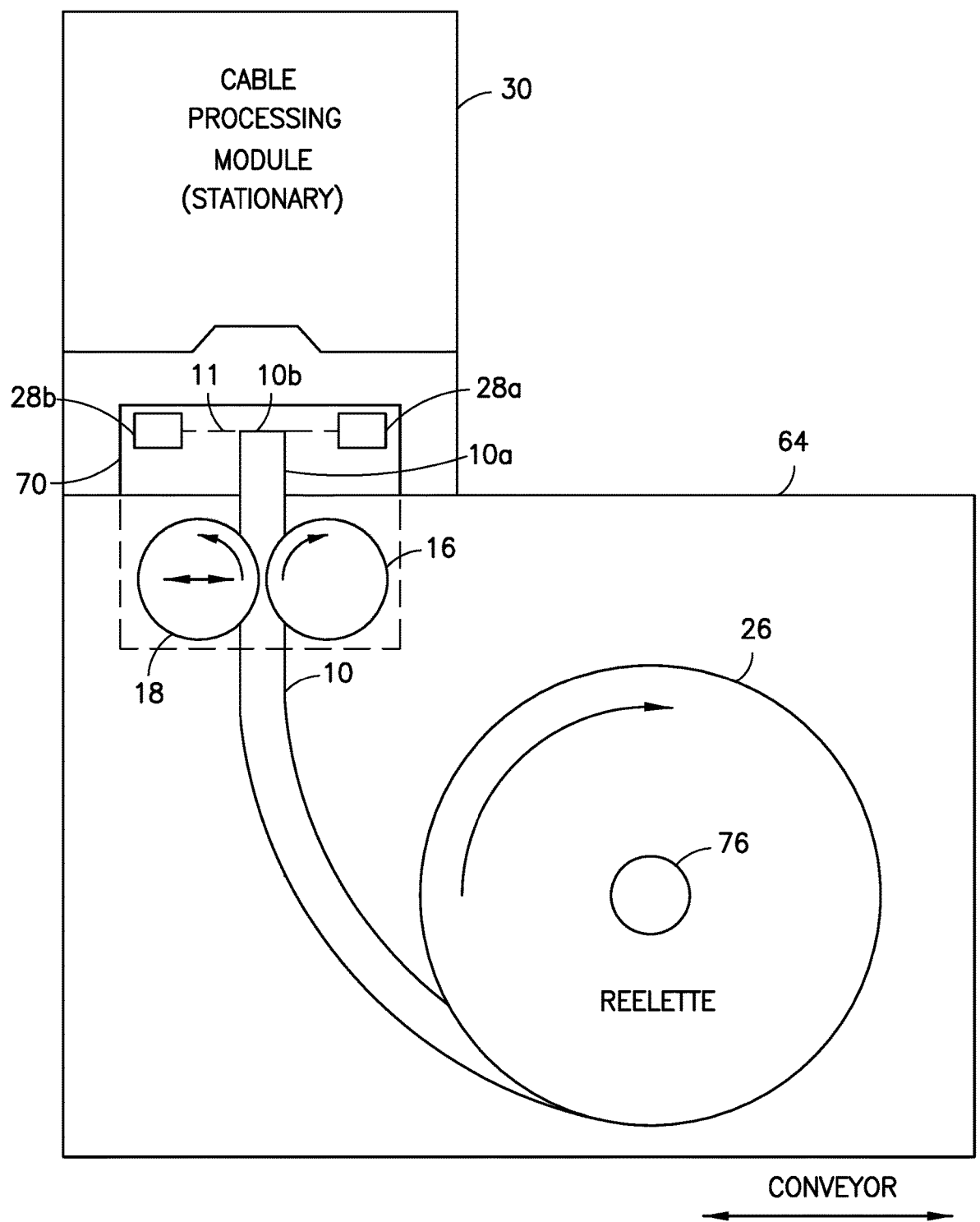
FIG. 4B is a diagram representing a top view of the apparatus depicted in FIG. 4A.

In accordance with some embodiments, each workstation includes a stationary motor (not shown in FIG. 3, but see motor 72 in FIGS. 4A and 4B). In accordance with one proposed implementation, the motor 72 is an electric stepper motor. The motor shaft speed will control how fast the drive wheel rotates (the speed at which the end of the cable 10 is moved), as well as which directions the wheels rotate in. The motor 72 is configured to rotate either clockwise or counterclockwise.

In response to detection of the arrival of the pallet 64 at the cable processing module 30 by a pallet detector (not shown in FIG. 3, but see pallet detector 160 in FIG. 5), the motor 72 is operatively coupled to the drive wheel 16. Subsequently the motor 72 is activated to drive the drive wheel 16 to rotate in the cable pushing direction. The shaft of the motor 72 is optionally equipped with a rotation encoder 73 (see FIG. 5) for determining the angular rotation of the drive wheel 16. During rotation of the drive wheel 16 in the cable pushing direction, the rotation encoder 73 tracks the rotation of the motor shaft to generate digital position information representing the length of cable 10 which has been fed past the scanning plane 11.

When a pallet 64 stops at the cable processing module 30, the drive wheel 16 and idler wheel 18 are driven to rotate in a cable pushing direction to cause the cable tip 10b to pass the cable tip detection mechanism (in this example, a photoelectric sensor 28), through the funnel 22, and into the cable processing equipment 24. Once the photoelectric sensor 28 is triggered, the rotation encoder 73 will begin to record the position of the cable tip 10b. This provides a way to track the inserted length of the cable 10 in real time, and subsequently cause the motor 72 to stop once the correct length of cable 10 has been fed into the cable processing equipment 24. The drive wheel 16 and idler wheel 18 continue to rotate in the cable pushing direction until a specified length of cable 10 has been inserted into the cable processing equipment 24 via the funnel 22.

FIG. 4A is a diagram representing a side view of a pallet 64 in a position adjacent a cable processing module 30, which pallet 64 is equipped with a cable feeding mechanism or apparatus. In accordance with a further embodiment, the feeding mechanism comprises a reelette 26 for holding a coil of cable 10 and a drive wheel 16 (not visible in FIG. 4A) for feeding an end of the cable 10 into the cable processing module 30. FIG. 4B shows a top view of the pallet 64 in a position adjacent the cable processing module 30. The pallet 64 further includes a cable positioning mechanism (not shown) that is controlled to place the tip 10b of the cable 10 at a repeatable position at each cable processing module 30.

As seen in FIG. 4A, the cable processing module 30 is mounted on a stationary plate 68. A stanchion 70 is affixed to the stationary plate 68 in a position in front of the cable processing module 30. A motor 72 is mounted to a base 70a of the stanchion 70. The motor 72 has an output shaft 74 which drives rotation of the drive wheel 16 (not visible behind the idler wheel 18 in FIG. 4A). In addition, a photoelectric sensor 28 is mounted to an upright portion 70b of the stanchion 70. The photoelectric sensor 28 is placed at an elevation such that the photoelectric sensor 28 is able to detect the cable tip 10b when it passes through a scanning plane 11 (indicated by a dashed line in FIGS. 4A and 4B) during cable pushing.

In accordance with the embodiment depicted in FIG. 4A, each coil of cable 10 is individually wound onto its own reelette 26, which reelette 26 is supported by and rotatably coupled to the pallet 64. The corral 66 (see in FIGS. 2A-2C) is not shown in FIG. 4A so that the reelette 26 is visible. The reelette 26 has an opening (not shown in FIG. 4A) on its outer periphery through which a portion of the cable 10 (including cable end 10a) passes. FIG. 4A shows a state in which the cable end 10a is disposed between rotating drive wheel 16 and idler wheel 18 (drive wheel 16 is located directly behind the idler wheel 18 and not visible in FIG. 4A), while the cable tip 10b is moving in a direction (indicated by an arrow in FIG. 4A) toward the cable processing module 30.

FIG. 4B shows a top view of the pallet 64 when the cable tip 10b is positioned at a scanning plane 11 of the photoelectric sensor 28. The double-headed straight arrow superimposed on the idler wheel 18 indicates that the idler wheel 18 is laterally movable away from and toward the drive wheel 16. Meanwhile the curved arrows superimposed on the drive wheel 16 and idler wheel 18 are intended to indicate that the drive wheel 16 and idler wheel 18 are rotating in a cable pushing direction. At the instant of time depicted in FIG. 4B, the cable tip 10b is positioned at the scanning plane 11 and is moving toward the cable processing module 30.

Figure 5:
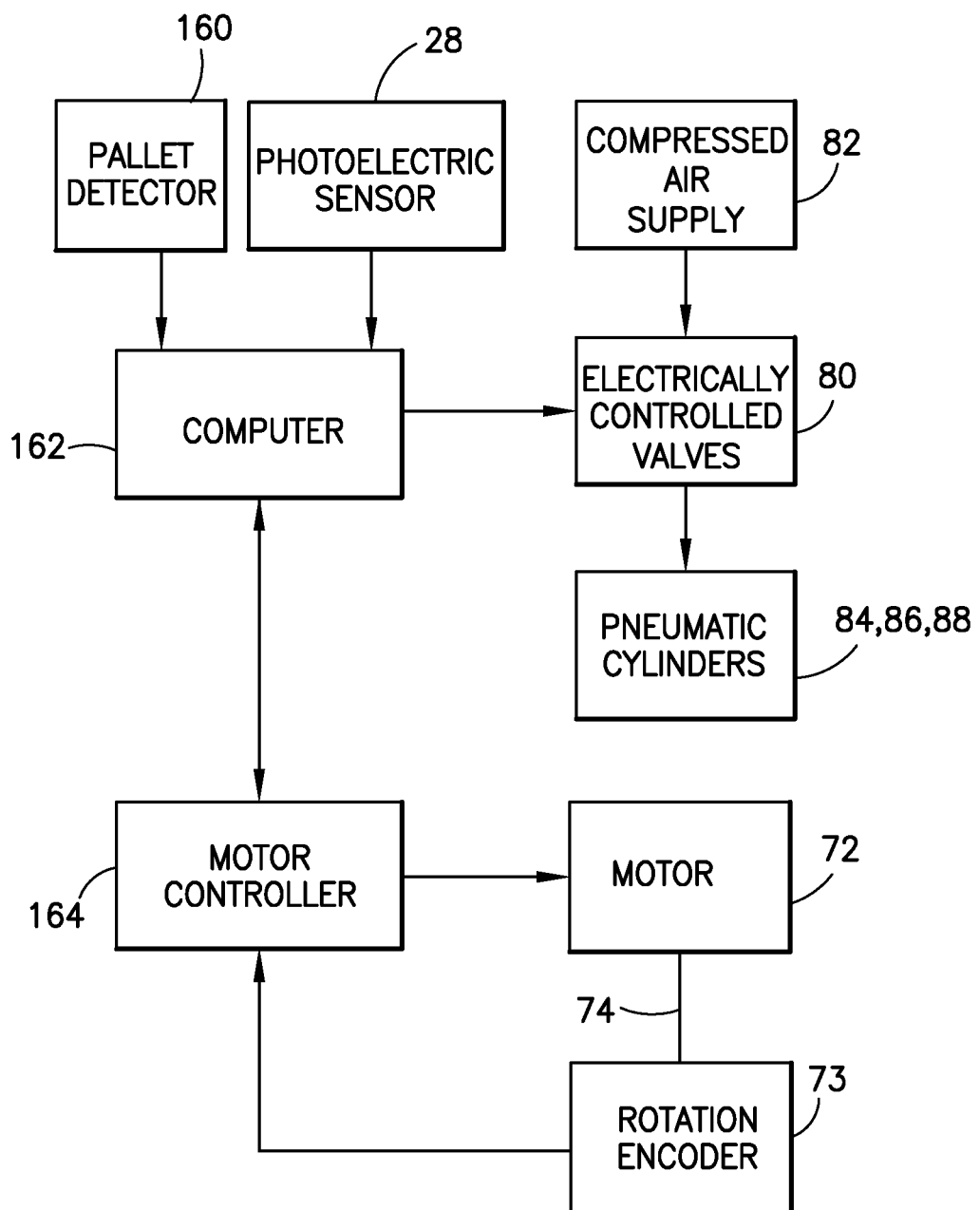
FIG. 5 is a block diagram identifying components of a cable processing workstation in accordance with one embodiment.

The cable processing module 30 includes a computer 162 (not shown in FIGS. 4A and 4B). FIG. 5 is a block diagram identifying some components of a cable processing workstation in accordance with one embodiment. As previously described, each cable processing workstation includes a cable guiding mechanism (such as funnel 22 or open-top funnel 170) to center or align the cable in a specific position relative to the cable processing equipment 24 (not shown in FIG. 5, but see FIG. 3). The cable processing workstation further includes a computer 162 that is configured to control various actuators and motors by executing pre-programmed sequences of machine control commands, such as computer numerical control commands. FIG. 5 depicts an example wherein the computer 162 is programmed to send control signals to various electrically controlled valves 80 which may be opened to supply compressed air from a compressed air supply 82 to one or more of a multiplicity of pneumatic cylinders 84, 86 and 88. The pneumatic cylinders 84, 86 and 88 may be used to move various components of the cable processing equipment 24. (A specific configuration of pneumatic cylinders 84, 86 and 88 for use in a shield trimming apparatus 45 will be described later in some detail with reference to FIGS. 20A-20J.) In alternative embodiments, the pneumatic cylinders may be replaced by electric motors.

The cable processing workstation depicted in FIG. 5 further includes a motor 72 and a rotation encoder 73 operatively coupled to the output shaft 74 of the motor 72. The rotation encoder 73 generates pulses which the computer 162 is configured to count for the purpose of determining the number of degrees of motor output shaft rotation, which angular measurement in turns represents a distance traveled by the cable tip 10b during that output shaft rotation. The computer 162 also receives sensor feedback from a photoelectric sensor 28 used to detect a cable tip position and a pallet detector 160 used to detect a pallet position. The computer 162 is configured to send commands to a motor controller 164 for controlling the motor 72 in accordance with feedback from photoelectric sensor 28, rotation encoder 73 and pallet detector 160.

The computer 162 of each cable processing module 30 is configured to perform the following operations: activate the motor 72 to drive rotation of the drive wheel 16 in a cable pushing direction to cause a specified length of cable 10 to be inserted into the cable processing equipment 24; activate the cable processing equipment 24 to perform an operation on the inserted cable end 10a; and activate the motor 72 to drive rotation of the drive wheel 16 in a cable pulling direction to cause the specified length of cable 10 to be removed from the cable processing equipment 24.

Each workstation comprises a rotation encoder 73 configured to output pulses representing the incremental angular rotations of an output shaft of the motor 72. The photoelectric sensor 28 is positioned and configured to issue a cable tip position signal indicating that interruption of transmitted light in the scanning plane 11 has started. In other words, the cable tip position signal is issued in response to the photoelectric sensor 28 detecting that a state of light not being blocked in the scanning plane 11 has transitioned to a state of light being blocked. The computer 162 is further configured to start a count of pulses output by the rotation encoder 73 in response to the cable tip position signal and then de-activate the motor 72 in response to the count reaching a specified value corresponding to a specific target length of cable 10 having been inserted in the cable processing equipment 24.

The photoelectric sensor 28 that detects the position of the cable tip 10b in each cable processing module 30 may be of the same type as the photoelectric sensor 28 incorporated in the cable tip positioning module 38. For example, digital laser sensors of various types are suitable. Many adaptable options are available off the shelf, such as proximity sensors and vision sensors.

In accordance with some embodiments, the photoelectric sensor 28 used to detect cable tip position is of a type that is also capable of measuring the diameter of the cable 10 to ensure that false positives are not caused by fingers or other objects larger than the typical cable diameter. The diameter measurement may also be used to confirm that the cable 10 is of the type expected by the computer 162 of the cable processing module 30.

In accordance with one proposed implementation, the photoelectric sensor 28 is a laser sensor of the "position recognition" type (a.k.a. a laser scan micrometer). In a laser scanner of this type, a scanning laser beam is emitted from a scanning light beam transmitter 28a, which scanning light beam scans in the scanning plane 11 and is then received by the light-detecting sensor 28b. In accordance with one embodiment, the light-detecting sensor 28b includes a linear array of light-detecting elements (e.g., a column of pixels in a charge coupled device). The area where the scanning laser beam is interrupted is identified clearly on the light-detecting sensor 28b. This type of laser sensor may be used for in-line cable tip position detection or cable outer diameter measurement.

The computer 162 of the cable processing module 30 is further configured to perform the following operations: compute a length of an interruption in light received by the light-detecting sensor 28b from the scanning light beam transmitter 28a; compare the computed length of the interruption to reference data representing a diameter of the type of cable 10 to be processed; and issue an alert signal when a difference of the computed length of the interruption and the reference data exceeds a specified threshold.

In accordance with other embodiments, the above-described cable positioning system may be used to position the tip of the cable at multiple positions within any given processing module. Such feature allows multi-step processing within a single module. The tip of the cable, for example, could be positioned at multiple positions within the laser scoring module 40 to allow the laser to score the cable in multiple locations. For very long strip lengths (four inches for example) the cable could be laser scored every inch. The jacket slug pulling module 42 would then pull of each one-inch slug one at a time (again using multi-step insertion). Thus the jacket puller only needs to overcome pull-off friction forces for one inch of jacket instead of four inches of jacket.

Referring again to FIG. 1, after the jacket slug pulling module 42 has pulled off the jacket slug 2a of the cable 10, the pallet 64 moves to the shield trimming module 44. The shield trimming module 44 incorporates equipment for trimming off a portion of the exposed portion of the shield 4 to reveal respective end portions of the wires 6 and 8 of the cable 10. This equipment will be referred to hereinafter as "shield trimming apparatus".

Figure 6:
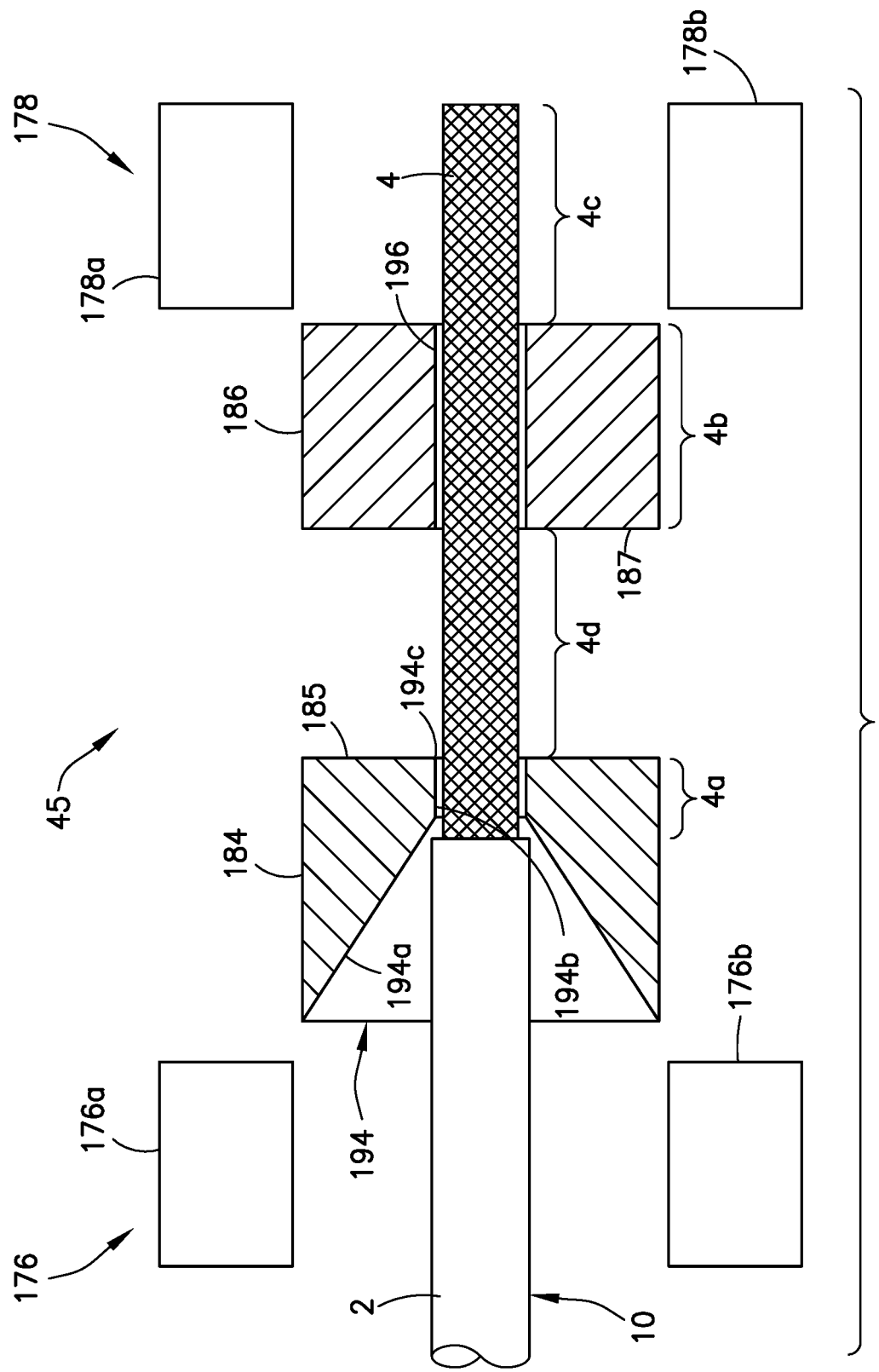
FIG. 6 is a diagram representing a partially sectional view of some components of a shield trimming apparatus in accordance with one embodiment.

FIG. 6 is a diagram representing a partially sectional view of some components of a shield trimming apparatus 45 in accordance with one embodiment. The shield trimming apparatus 45 includes a cable gripper 176, a first press die 184, a second press die 186 and a shield gripper 178. The dies are shown in section; the grippers are not. In accordance with one embodiment, the cable gripper 176 and first press die 184 are stationary; the second press die 186 and shield gripper 178 are translatable relative to the cable gripper 176 and first press die 184. In accordance with another embodiment, the cable gripper 176 may be movable relative to the first press die 184 (particularly when the shield trimmer is used as manually-loaded benchtop equipment).

In the case where the shield trimming apparatus 45 depicted in FIG. 6 is set up at a workstation in an automated production line of the type depicted in FIG. 1, the end 10a of the cable 10 may be fed by a drive roller 16 first into a funnel 22 (see FIG. 3) and then into shield trimming apparatus 45. Alternatively, the shield trimming apparatus 45 disclosed herein may be configured as benchtop equipment, in which case the unjacketed end 10a of the cable 10 may be fed to the correct entry point manually.

As seen in FIG. 6, the cable gripper 176 includes a pair of cable gripper fingers 176a and 176b; the shield gripper 178 includes a pair of shield gripper fingers 178a and 178b. The cable gripper fingers 176a and 176b are translatable in opposite directions to open or close the cable gripper 176. Similarly, the shield gripper fingers 178a and 178b are translatable in opposite directions to open or close the shield gripper 178. The cable gripper 176 is located on the front (entry) side of the shield trimming apparatus 45. When the cable gripper fingers 176a and 176b are closed, the cable gripper 176 maintains the position of the cable 10 during processing. The shield gripper 178 (which is movable) is located on the rear side of the shield trimming apparatus 45 and grips the exposed shield 4 of the cable 10.

In the scenario depicted in FIG. 6, the end of the cable 10 has been inserted into the holes 194 and 196 of the first and second press dies 184 and 186 (which are separated by a distance), but has not yet been gripped by the cable gripper 176 and shield gripper 178. In this positional state: (a) a first exposed shield portion 4a of shield 4 is disposed inside the first press die 184; (b) a second exposed shield portion 4b of shield 4 is disposed inside the second press die 186; (c) a third exposed shield portion 4d of shield 4 (connecting the first and second exposed shield portions 4a and 4b) is disposed in the space separating the first and second press dies 184 and 186; and (d) a fourth exposed shield portion 4c of shield 4 is disposed between shield gripper fingers 178a and 178b.

Figure 7:
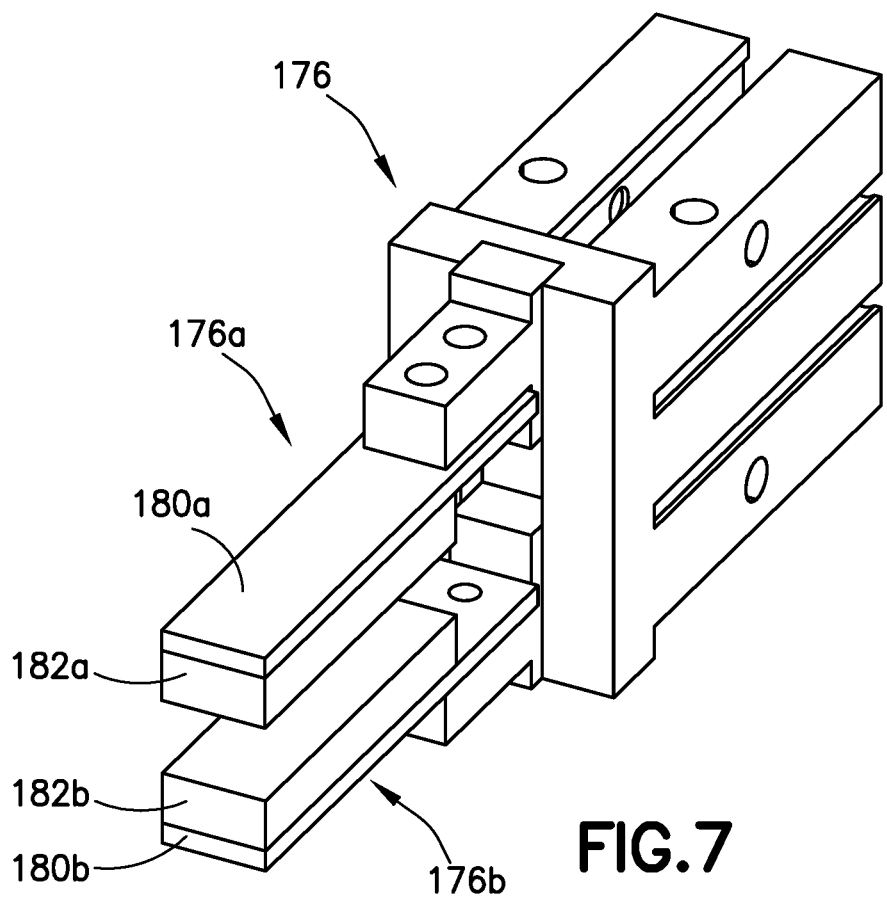
FIG. 7 is a diagram showing a view of a cable gripper in the form of a pneumatic pick-and-place gripper in accordance with one proposed implementation.

FIG. 7 is a diagram showing a view of a cable gripper 176 in the form of a pneumatic pick-and-place gripper in accordance with one embodiment. In accordance with an alternative embodiment, a servo-actuated gripper may be employed. In either case, the cable gripper fingers 176a and 176b are preferably lined with a compliant material that can conform around the profile of the cable in order to maximize the area of contact between the gripper pads and the cable, but does not damage the cable when the cable gripper 176 is actuated closed. Cables processed using the equipment disclosed herein may have many different cross-sectional profiles, depending on the number of wires within the cable, so it is important that the material be compliant enough to conform over different cable profiles while maintaining effective grip.

The embodiment of a cable gripper 176 depicted in FIG. 7 has two opposing cable gripper fingers 176a and 176b. The cable finger 176a includes a finger beam 180a made of a non-compliant material (e.g., steel) and a gripping pad 182a made of compliant material (e.g., rubber or silicone) attached to a bottom surface of the finger beam 180a. Similarly, the cable finger 176b includes a finger beam 180b made of a non-compliant material and a gripping pad 182b made of compliant material attached to the top surface of the finger beam 180b. The gripping pads 182a and 182b make contact with the cable when the cable gripper 176 is actuated. The gripping pads 182a and 182b do not necessarily have to contact each other. The cable gripper 176 should have uniform smooth surfaces and be devoid of any sharp edges or rough surfaces that could dig into, tear, or otherwise damage the outer jacket of the cable. The gripping pads 182a and 182b should be large enough to maintain an effective amount of grip on the cable. In one proposed implementation, the gripping pads 182a and 182b were oriented such that they made contact along 0.5 inch of the cable. The shield gripper 178 may have a construction identical to the cable gripper 176 depicted in FIG. 6.

The cable and shield grippers 176 and 178 may be pneumatically or servo actuated with force feedback. Suitable methods of force feedback include using modulated air pressure or using a load cell/strain gauge. The gripping force should not be so large that the cable risks becoming crushed; however, it should be large enough such that the cable does not slide or otherwise move during processing. The cable and shield grippers 176 and 178 should be able to open wide enough to allow cable to pass through/between without contacting the cable.

Referring again to FIG. 6, the first press die 184 is a plate that has been drilled through with at least one hole 194 for the cable 10 to pass through. The hole 194 includes a countersunk feature that acts as a guiding funnel during cable insertion. More specifically, the hole 194 includes a circular conical section 194a and a circular cylindrical section 194b that terminates at a hole edge 194c. Besides its guiding effect, another possible purpose of the circular conical section narrowing is to provide a circumferential surface that will stop the end of jacket 2 from entering circular cylindrical section 194b of hole 194. Possibly other mechanisms can be used to stop the cable 10 from further entering hole 194 or prevent the inserted portion of the cable 10 exceeding a specified length. The second press die 186 (also a plate) has a hole 196 through which the unjacketed portion of the cable 10 is passed. The hole 196 may be a circular cylindrical bore. The hole 196 of the second press die 186 is aligned or centered with the circular cylindrical section 194b of the hole 194 formed in the first press die 184. As used herein, the term "aligned", in the context of two circular cylindrical or conical holes, means that the center axes of the holes are coaxial or nearly coaxial.

The first press die 184 should be made of a material that produces a sharp edge along the hole edge 194c and is hard enough to maintain hole features without excessive wearing along the hole edges. An example suitable material is tool steel. Other examples include metals that have been heat treated, cold worked, or processed in some other way to increase the hardness of the metal (or change other properties associated with wear resistance). The second press die 186 may be made of a similar material.

The only portion of the first press die 184 that is at risk of wear is the hole edge 194c. The holes must be drilled through a hard, wear-resistant material. However, the entirety of the first press die 184 does not have to be made of wear-resistant material if there is a replaceable, internal "die" made of wear-resistant material. The internal die could be attached to the first press die 184 using fasteners or a slide-in track.

Figure 8:
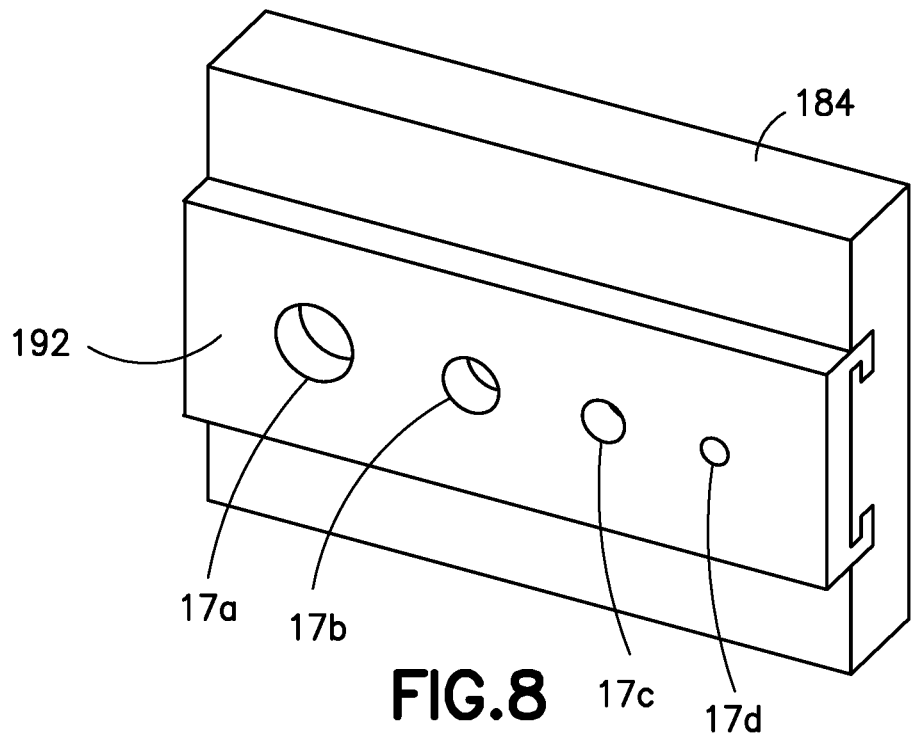
FIG. 8 is a diagram showing a view of a press die having a slide-in internal die with a multiplicity of holes of different sizes.

Optionally, the first press die 184 may have a cable entry hole system that includes a multiplicity of holes having different configurations, including different sizes and/or different shapes. Only one hole 194 is visible in FIG. 6 (but see FIG. 19A). The second press die 186 would also be constructed to have a multiplicity of holes which respectively align with multiplicity of holes of the first press die 184. FIG. 8 is a diagram showing a view of a first press die 184 having a slide-in internal die 192 with a multiplicity of holes 17a-17d of different sizes. The cable may be inserted into any one of the holes 17a-17d while the first press die 184 is stationary.

The holes 194 and 196 in the first and second press dies 184 and 186 respectively should be configured to permit passage of the cable based on the cable diameter. As will be explained in more detail below, during the automated shield trimming process, the exposed shield portion 4d (see FIG. 6) will expand radially outward, becoming bunched between the confronting surfaces 185 and 187 of the first and second press dies 184 and 186 respectively. it is important that the shield 4 become bunched between the confronting surfaces 185 and 187, not within the holes 194 and 196. This is because the trim occurs when the shield strands deflect radially outward past the hole edge 194c, and then tear across the hole edge 194c upon removal of the cable 10. To prevent shield strands from deflecting radially outward (bunching up?) outside of the intended area, i.e., the space that separates the first and second press dies 184 and 186, the diameter of the circular cylindrical section 194b of hole 194 and the diameter of hole 196 must be scaled based on the cable diameter. In accordance with one proposed implementation, the hole diameters exceeded the unjacketed cable diameter by less than 0.036 inch.

Figure 9:
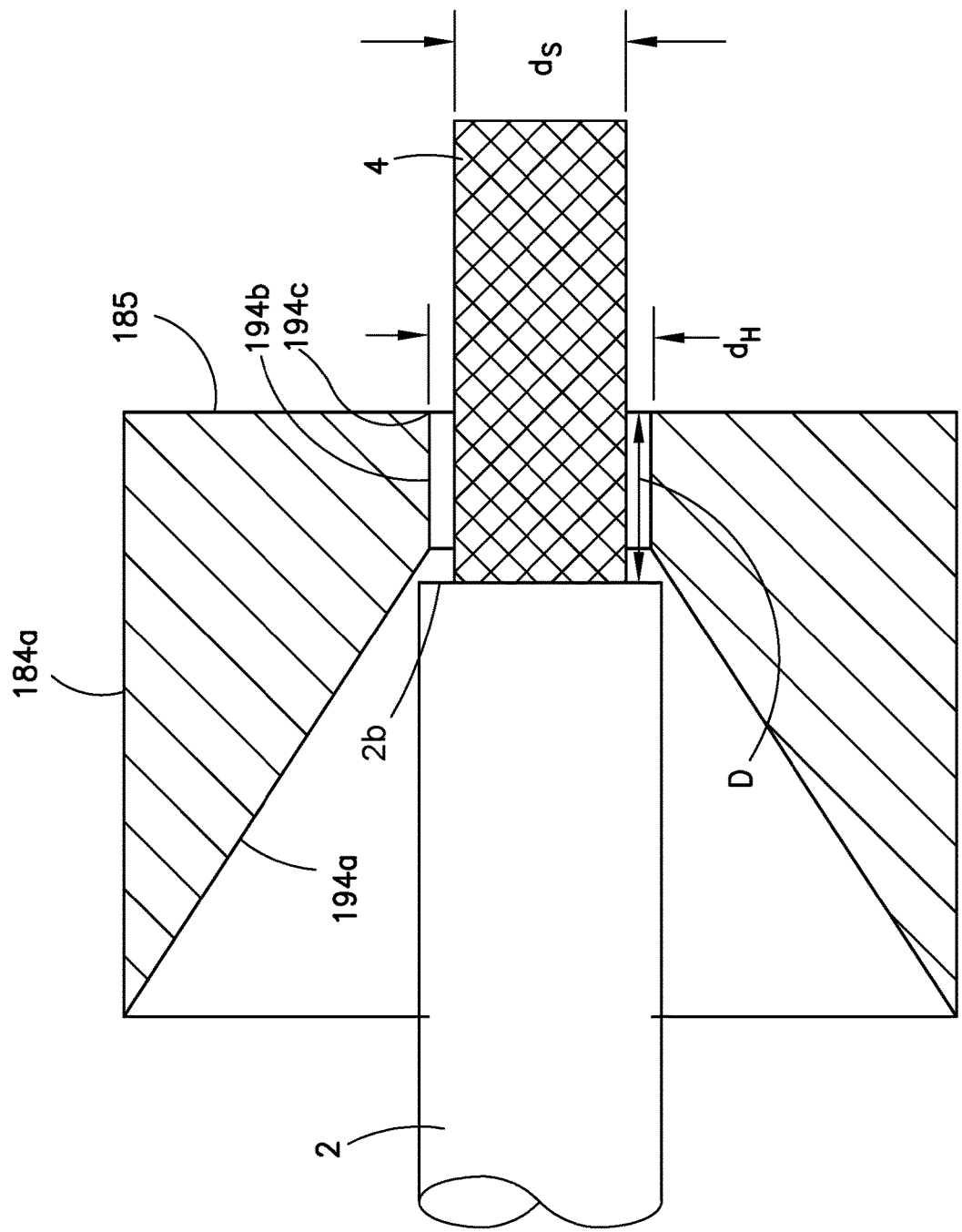
FIG. 9 is a diagram showing measurements which may be used to determine an optimal position of the end of the cable jacket relative to a hole edge of a press die (shown in section) where the shield will be torn.

FIG. 9 is a diagram showing a sectional view of a press die 184a in accordance with one embodiment. The press die 184a has a hole 194 that includes a circular conical section 194a and a circular cylindrical section 194b that terminates at a circular hole edge 194c. FIG. 9 also shows measurements which may be used to determine an optimal position of the end 2b of the cable jacket 2 relative to the hole edge 194c where the shield 4 will be torn. In order to produce, for example, a 0.25 inch shield trim, the end 2b of the cable jacket 2 must be located at a certain distance D away from the hole edge 194c. In one proposed implementation, the distance D is equal to the first exposed shield portion 4a of shield 4 as defined in FIG. 6. This distance D can be used to position cables in a repeatable location for processing, and can be determined as the length of the exposed shield in the hole 194. To obtain an exemplary length of 0.25" for the trimmed exposed shield, the portion of the shield bunch 188 that flares outward to the hole edge 194c should be taken into account. Accordingly, in accordance with the particular example being discussed here, the distance D between the end 2b of the cable jacket 2 and the hole edge 194c equals 0.25 inch minus half the difference between the diameter $d_H$ of the circular cylindrical section 194b of hole 194 and the diameter $d_S$ of the exposed shield 4 of the unjacketed portion of the cable 10, which relationship may be expressed as follows:

$$D = 0.25 - (d_H - d_S)/2$$

where $(d_H - d_S)/2$ represents the extent of the portion of the shield bunch 188 that flares outward to the hole edge 194c. Once a determination has been made regarding the optimal value of the distance D separating the end 2b of the cable jacket 2 from the hole edge 194c of the first press die 184a, this information may be used to design the hole 194 such that the narrowing of the circular conical section 194a prevents the impinging end 2b of the cable jacket 2 from moving further forward.

This concept could work for a benchtop apparatus used to process cables of a very similar outer diameter, which would be advantageous because the operator could just "bottom out" the cable in the hole. However, the system disclosed herein may be used to process cables of many different diameters and jacket thicknesses. For a fully automated system, a preferred arrangement would be to use a larger-than-jacket hole and use the drive wheel 16 and idler wheel 18 to properly position the cable 10 within the hole.

Figure 10:
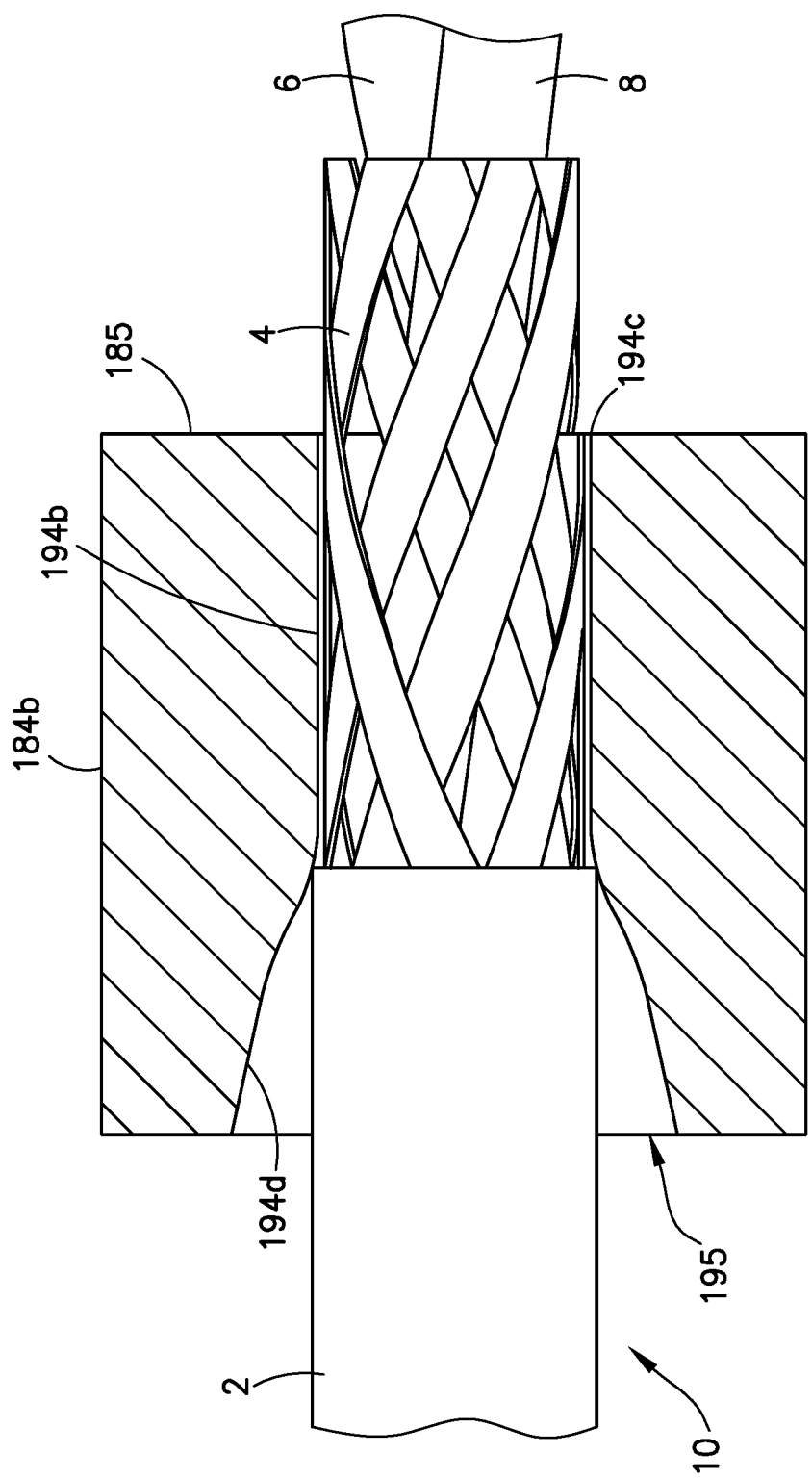
FIG. 10 is a diagram showing a sectional view of a press die in accordance with an alternative embodiment.

FIG. 10 is a diagram showing a sectional view of a press die 184b in accordance with an alternative embodiment regarding the shape of the hole 195. For the sake of illustration, FIG. 10 depicts a press die 184b having a portion of a twisted-pair shielded cable 10 inserted in a hole 195. However, a shield trimming apparatus having press die 184b could also be used to trim the shielding of cables containing other numbers and configurations of electrical wires.

Referring to FIG. 10, the hole 195 in press die 184b differs in shape from the hole 194 depicted in FIG. 6. The difference is that hole 195 has a funnel-shaped section 194d which is not a truncated circular cone. More specifically, the rate at which the diameter of the funnel-shaped section 194d decreases is not linear and decreases more rapidly in the region adjacent to the circular cylindrical section 194b. Again, in one embodiment, besides its guiding effect, one possible purpose of such narrowing is to provide a circumferential surface that will stop the end 2b of jacket 2 from entering circular cylindrical section 194b of hole 195.

Referring again to FIG. 6, the second press die 186 may have a construction similar to that of the first press die 184 and may be made of the same material. The second press die 186 includes a hole 196 that has a similar diameter (hole 196 may be slightly larger than hole 194 to ensure the cable does not snag when inserted) and is aligned with the circular cylindrical section 194b of hole 194 in the first press die 184. The second press die 186 is able to move (e.g., translate) relative to the first press die 184. In one embodiment, press die 184 is stationary. The second press die 186 may be displaced by a pneumatic or electrical linear actuator. For example, the linear actuator may take the form of a double-acting pneumatic cylinder having a piston, the end of the piston being coupled to the second press die 186. In another example, the linear actuator may take the form of a lead screw that threadably engages a nut attached to the linear actuator, the lead screw being driven to rotate by a servo motor. In any case, the second press die 186 may be mounted on a carriage that rides on a pair of linear tracks that allow only translation back and forth between two limit positions.

Still referring to FIG. 6, the shield gripper 178 may have a construction similar if not identical to the structure of the cable gripper 176 depicted in FIG. 7. The shield gripper 178 is located on the rear side of the apparatus and grips the exposed shield 4 of the cable 10. While gripping the shield 4, the shield gripper 178 moves with second press die 186; this causes the shield 4 to move over the wires 6 and 8 and bunch between the first and second press dies 184 and 186. The shield gripper fingers 178a and 178b should have gripping pads (similar to gripping pads 182a and 182b seen in FIG. 7) large enough to maintain an effective amount of grip on the cable shield 4. The shield gripper 178 may be pneumatically or servo actuated with force feedback. In the case of pneumatic actuation, the shield gripper 178 may be actuated using reduced pneumatic pressure compared to the pneumatic pressure used to actuate the cable gripper 176.

The gripping force exerted by the shield gripper 178 should be large enough to effectively grip the shield 4 and slide the shield over the underlying wires 6 and 8 to form the desired "bunching". It is important that the force not be so large that the shield 4 and/or wires 6, 8 are crushed or damaged. Additionally, if the force is so large that the underlying wires 6 and 8 are also gripped, the wires 6 and 8 could be bunched, deformed and squeezed and/or crushed between the mutually confronting surfaces 185 and 187 of the first and second press dies 184 and 186 when the second press die 186 is actuated, causing significant damage to the cable 10. Also, the shield gripper fingers 178a and 178b should be separable by a distance sufficient to allow the cable 10 to pass through/between without contacting the cable 10.

The operation of the shield trimming apparatus 45 depicted in FIG. 6 will now be described in further detail. FIGS. 11A through 11G are diagrams that represent respective partially sectional views of a shield trimming apparatus 45 for trimming a portion of a shield 4 from the cable 10a at seven stages in an automated shield trimming operation.

Figure 11A:
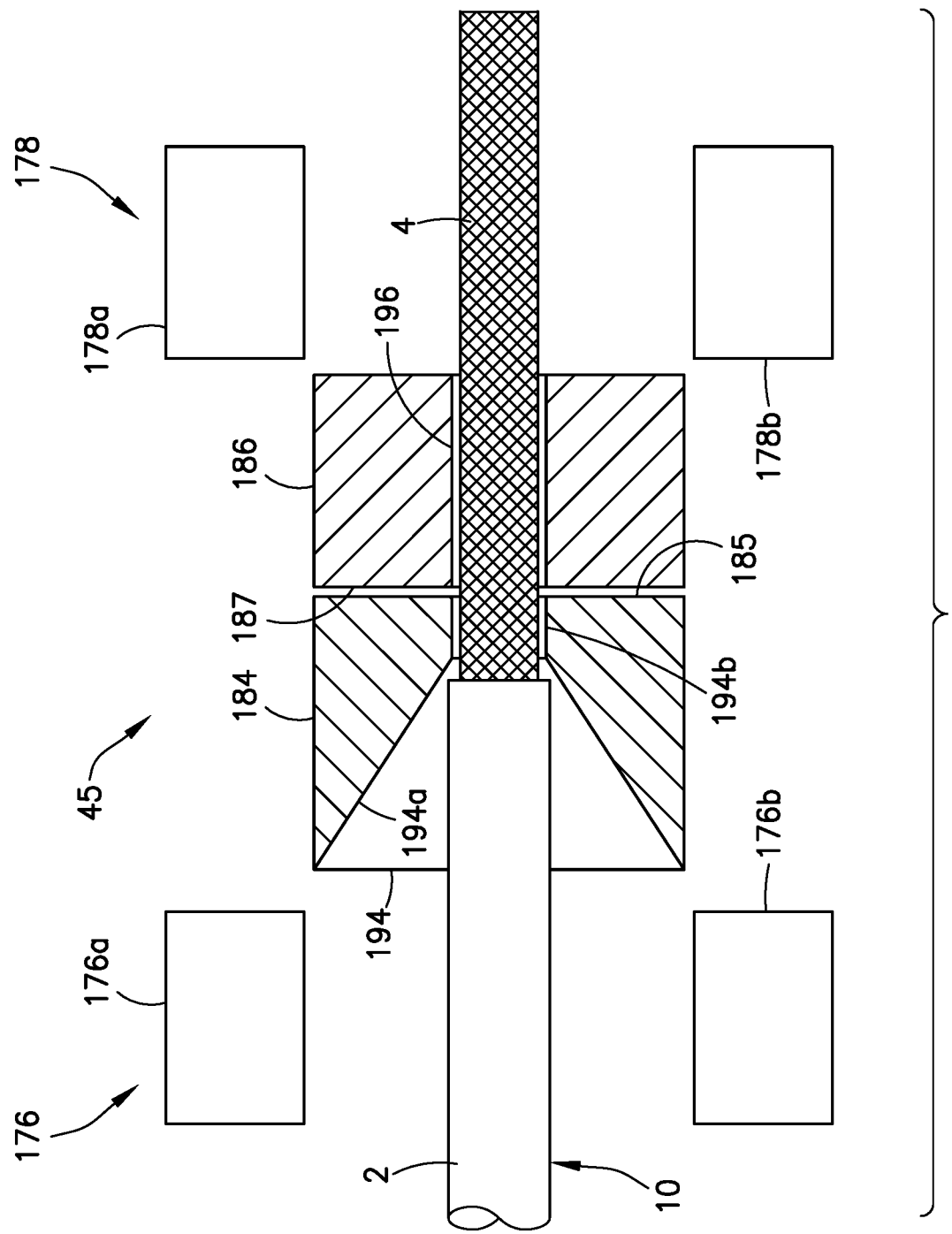
FIGS. 11A through 11G are diagrams representing respective partially sectional views of an apparatus for trimming a portion of a shield from the end of a cable at seven stages in an automated shield trimming operation.
Figure 11B:
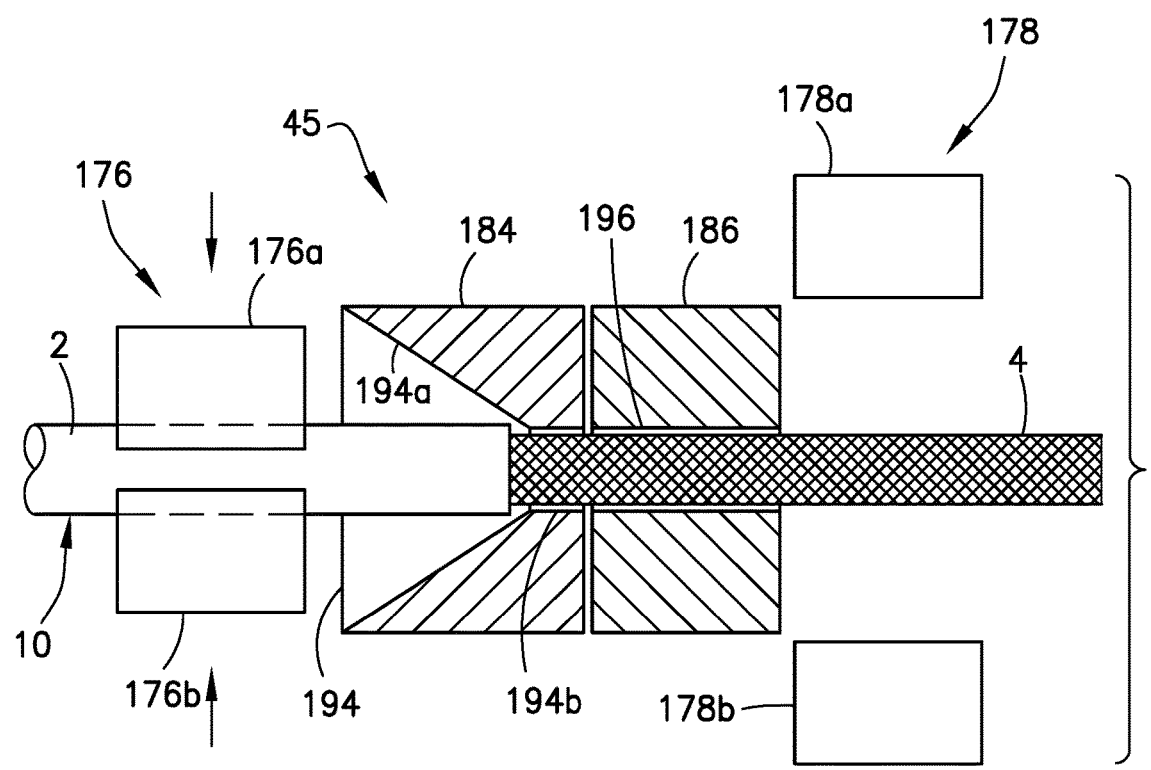
Figure 11C:
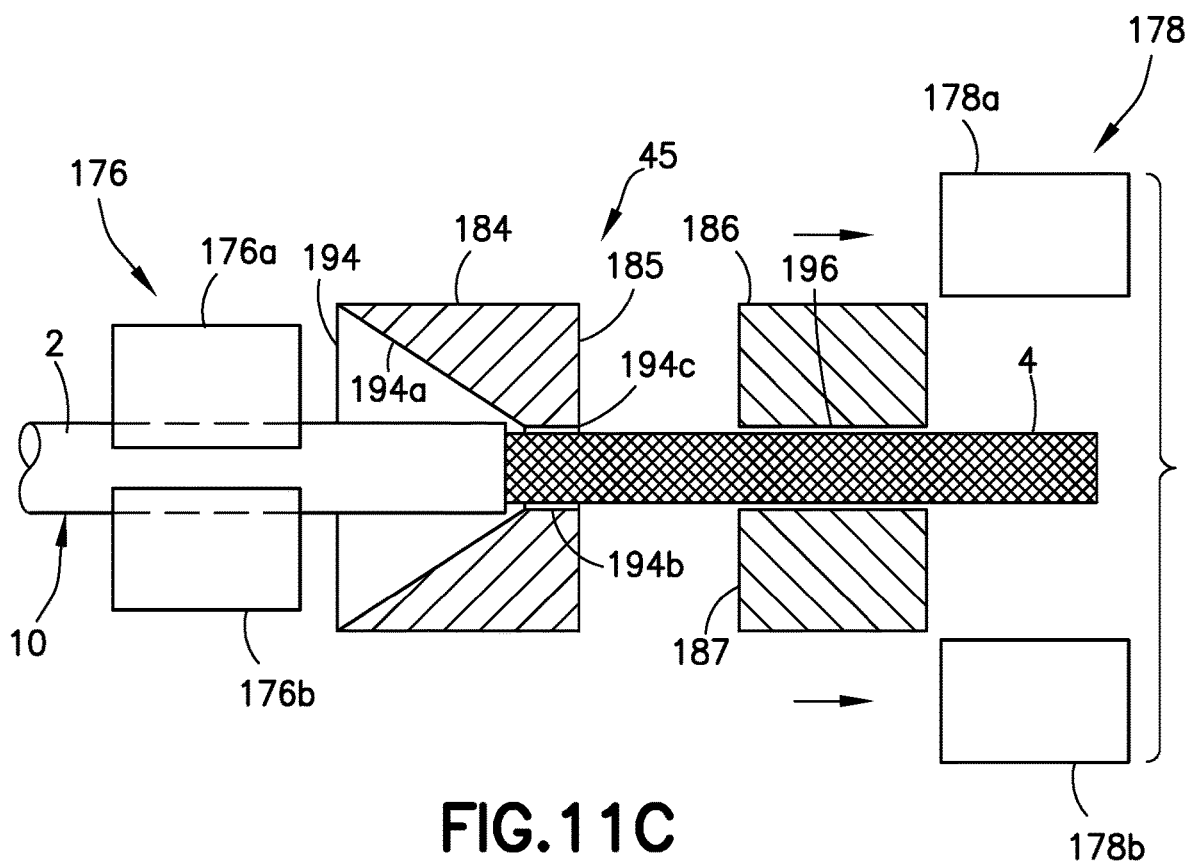

FIG. 11A is a partially sectional view of a shield trimming apparatus 45 previously described in some detail with reference to FIG. 6 The shield trimming apparatus 45 includes a cable gripper 176, a first press die 184, a second press die 186 and a shield gripper 178. The dies are shown in section; the grippers are not. The cable gripper 176 and first press die 184 are stationary; the second press die 186 and shield gripper 178 are translatable relative to the first press die 184 between the axial position shown in FIGS. 11A, 11B and 11E-11G and the axial position shown in FIGS. 11C and 11D.

Figure 11D:
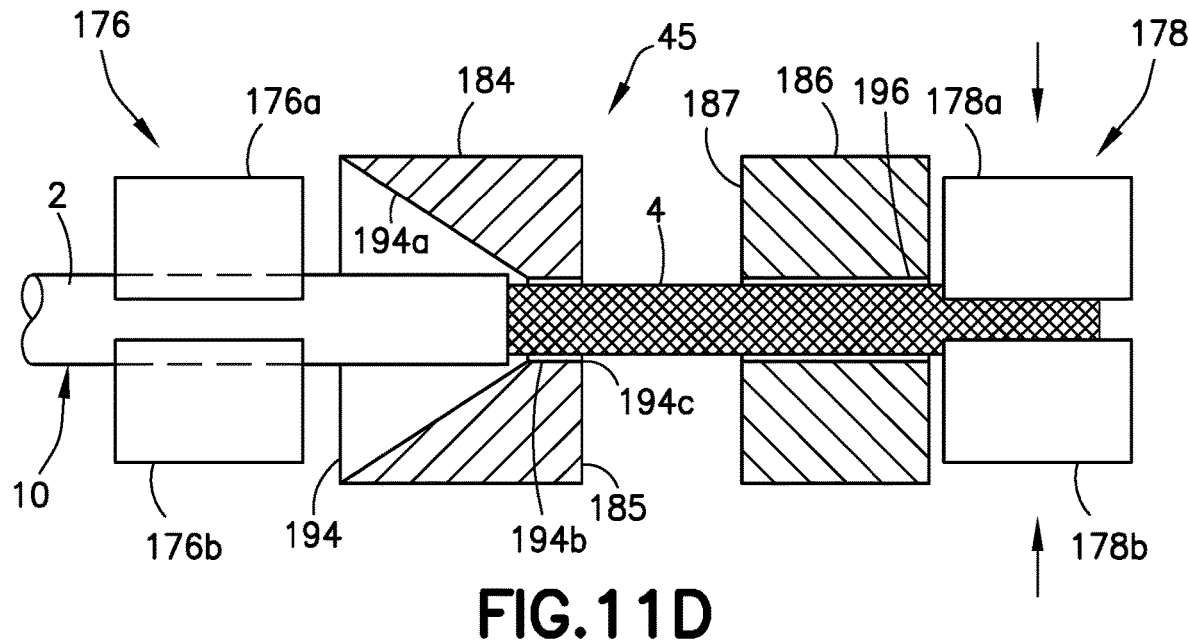
Figure 11E:
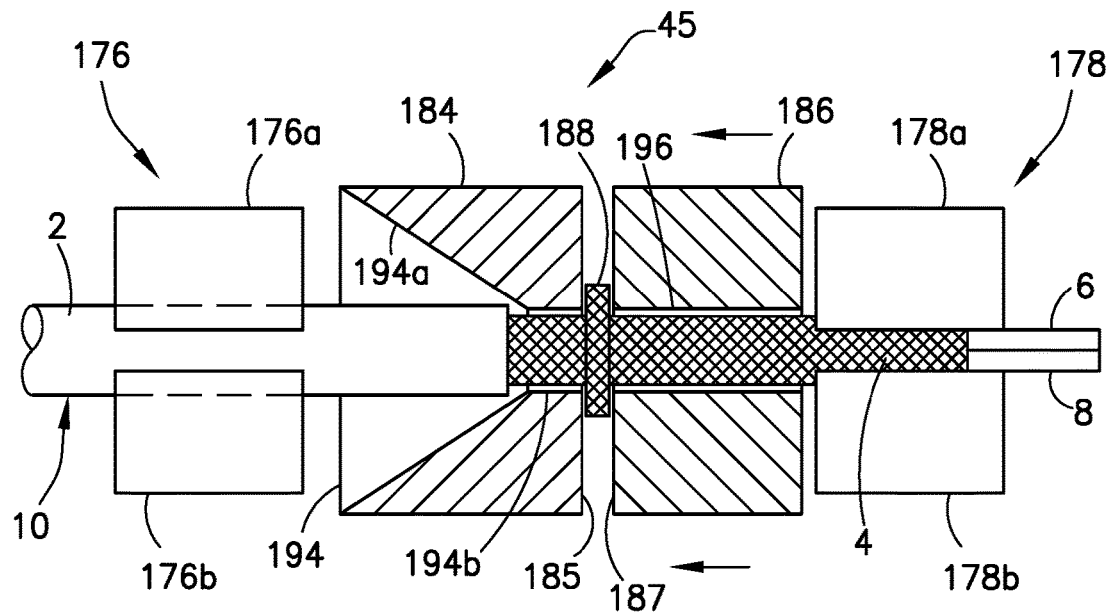
Figure 11F:
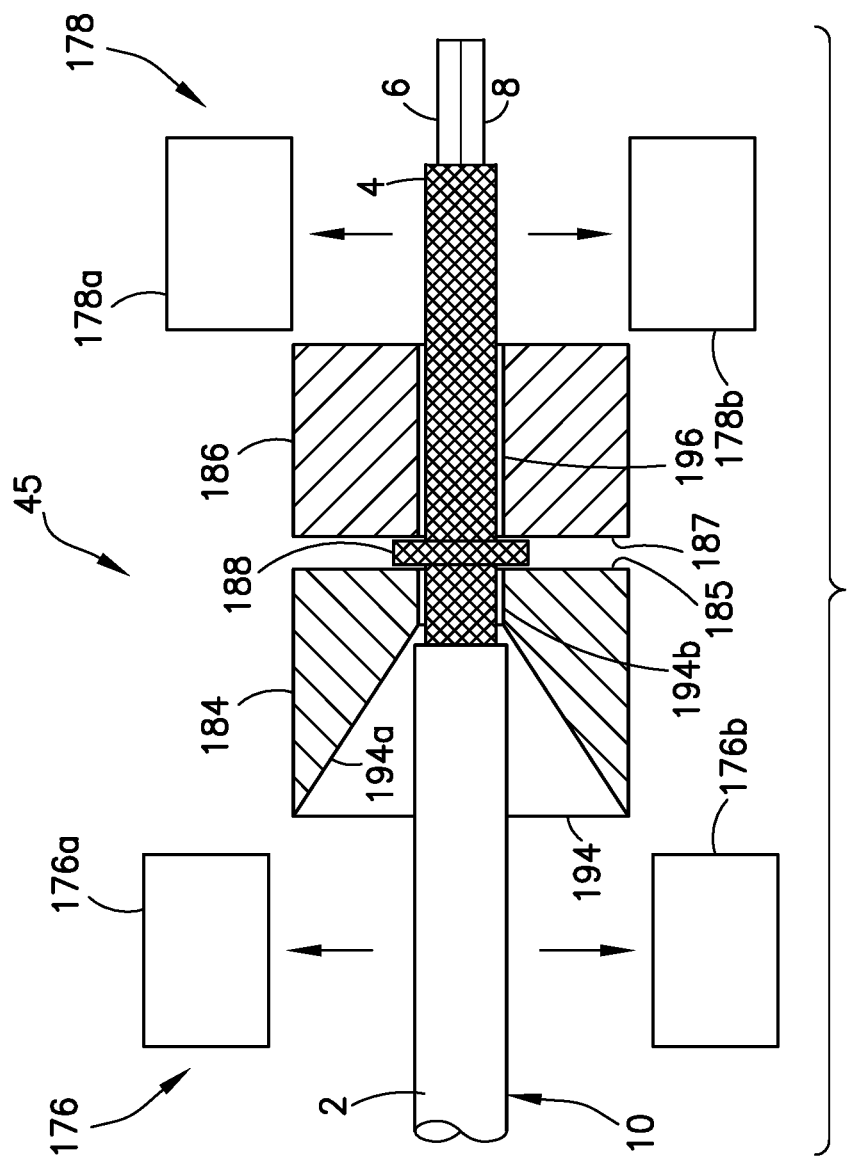
Figure 11G:
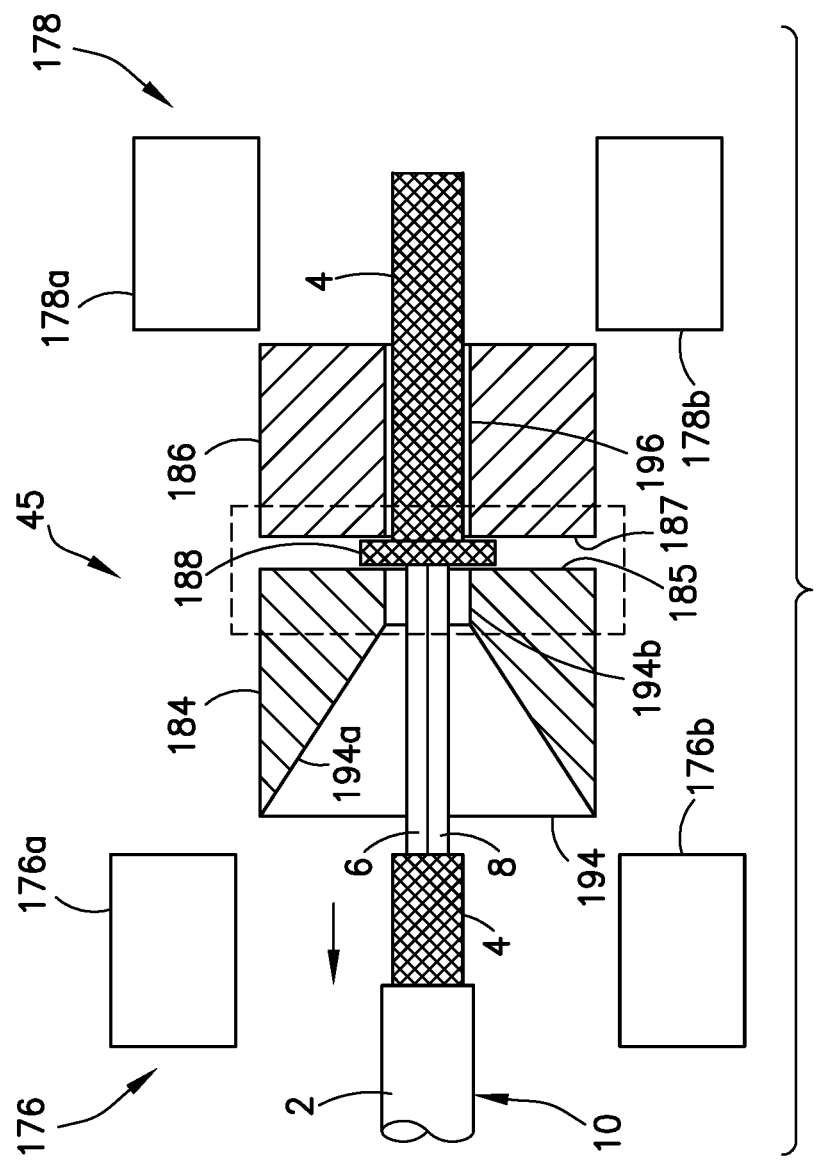

As seen in FIG. 11A, the cable gripper 176 includes a pair of cable gripper fingers 176a and 176b; the shield gripper 178 includes a pair of shield gripper fingers 178a and 178b. The cable gripper fingers 176a and 176b of the cable gripper 176 are translatable in opposite directions between respective open positions (as seen in FIGS. 11A, 11F and 11G) and respective closed positions (as seen in FIGS. 11B-11E). The shield gripper fingers 178a and 178b of the shield gripper 178 are translatable in opposite directions between respective open positions (as seen in FIGS. 11A-17C, 11F and 11G) and respective closed positions (as seen in FIGS. 11D and 11E). The cable gripper 176 is located on the front (entry) side of the shield trimming apparatus 45. When the cable gripper fingers 176a and 176b are closed, the cable gripper 176 maintains the position of the cable 10 during processing. The shield gripper 178 is located on the rear side of the shield trimming apparatus 45 and grips the exposed shield 4 of the cable 10.

The cable gripper 176 may be actuated to grip the cable 10 by respective double-acting pneumatic cylinders or electric motors with lead screws or other suitable means. Similarly, the shield gripper 176 may be actuated to grip the shield 4 by respective double-acting pneumatic cylinders or electric motors with lead screws or other suitable means. Preferably the grippers are pneumatically or servo actuated with force feedback. Suitable methods of force feedback include using modulated air pressure or a load cell/strain gauge.

In the first stage depicted in FIG. 11A, the second press die 186 is pushed against the first press die 184 to eliminate any gap that may allow the cable to pass through both dies without misalignment or snagging of the exposed shielding at the entrance of the hole 196 of the second press die 186. Both the cable gripper 176 and the shield gripper 178 are open. A cable 10 having an unjacketed cable end with exposed shield 4 is inserted through both of the first and second press dies 184 and 186. In the second stage depicted in FIG. 11B, the cable gripper 176 is closed to hold the cable 10 in place. In the third stage depicted in FIG. 11C, the second press die 186 is moved away from the first press die 184. In the fourth stage of depicted in FIG. 11D, the shield gripper 178 is closed to grip the shield 4. In the fifth stage depicted in FIG. 11E, the second press die 186 and the shield gripper 178 are moved in unison toward the first press die 184. This causes a portion 188 of the shield 4 to bunch (hereinafter "shield bunch 188") between the first and second press dies 184 and 186 and become pinched between the press dies. The shield gripper 186 causes portions 4b and 4c of the exposed shield 4 to slide over the wires 6 and 8 and the second press die 186 constrains portion 4b of the sliding portion from displacing radially outward. In the sixth stage depicted in FIG. 11F, the cable and shield grippers 176 and 178 both open to release the cable 10 while the shield bunch 188 of shield 4 remains pinched between the first and second press dies 184 and 186. In the seventh stage depicted in FIG. 11G, the cable 10 is removed from the shield trimming apparatus 45. When the cable 10 starts to retract in the direction indicated by the arrow in FIG. 11G, the shield strands connecting the shield bunch 188 to an adjacent unbunched portion of the shield 4 are torn across the stress concentration points created by the hole edge 194c (best seen in FIGS. 11C and 11D) of the first press die 184, resulting in a uniformly trimmed shield.

In a fully automated system, the cable 10 may be removed from the shield trimming apparatus 45 by activating the drive wheel 16 (see, for example, FIG. 3) to rotate in a cable pulling direction. In the case of a benchtop version, the cable 10 may be removed manually by pulling the cable out to break shield strands or by having cable gripper 176 move away from hole 194 to move the cable 10 out enough to break the shield strands.

Figure 12:
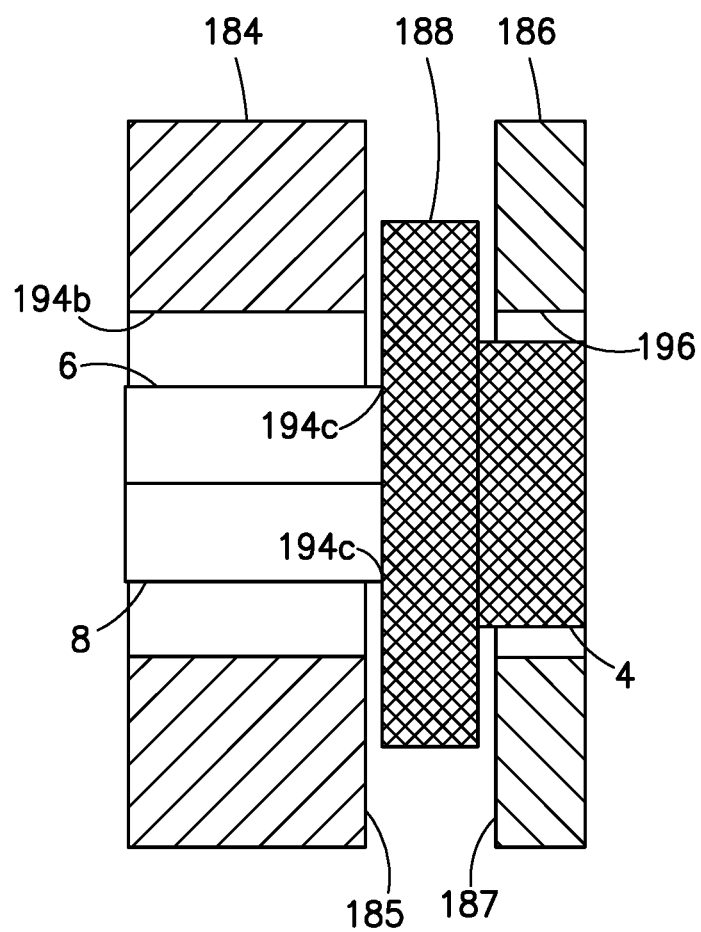
FIG. 12 is a diagram representing a magnified view of the portion of FIG. 11G inside the dashed rectangle indicated in FIG. 11G.

The portion of the shield 4 that has been trimmed off is partly depicted in FIG. 12, which shows a magnified view of the portion of FIG. 11G inside the dashed rectangle indicated in FIG. 11G. As seen in FIG. 12, the shield bunch 188 of the shield 4 remains momentarily pinched between the confronting surfaces 185 and 187 of the first and second press dies 184 and 186 as the wires 6 and 8 of the cable 10 are pulled out of the portion of the shield (hereinafter "shield debris") remaining in the second press die 186.

Various methods may be employed to remove the shield debris from the shield trimming apparatus 45 after each shield trim procedure. An air blast, air suction, pneumatic gripper, manual removal, or some combination of these solutions could be used. In addition, a removable tray may be provided. The shield debris could be funneled into the tray, which tray may be periodically removed and then emptied by the system operator.

After the shield trimming module 44 has trimmed the shield 4 of the cable 10, the pallet 64 moves to the shield trim inspection module 46 (see FIG. 1). The shield trim inspection module 46 performs a quality check of the trimmed shield using a vision inspection system.

In accordance with the embodiment depicted in FIGS. 11A-11G, the second press die 186 is able to move relative to the first press die 184 via pneumatics or motor actuation. In particular, the second press die 186 moves from position depicted in FIG. 11D to the position depicted in FIG. 11E. This movement will be referred to hereinafter as the "shield bunching stroke". The leftward movement (indicated by arrows in FIG. 11E) of the second press die 186 during the shield bunching stroke causes the gripped portion of shield 4 to travel a distance that is adjustable prior to the start of a shield trimming operation. More specifically, the distance traveled by the shield portion 4b (see FIG. 6) during the shield bunching stroke may be varied in dependence on the diameter of the cable being processed. The shield 4 must be gripped at a certain distance away from the end 2b of the cable jacket 2 in order to produce a large enough outward radial displacement prior to pinching of the radially outwardly displaced portion of the shield 4. Smaller-diameter cables require that the shield 4 travel a shorter distance in order to achieve maximum outward radial displacement away from the wires being shielded. If the shield 4 is gripped too close to the end 2b of the cable jacket 2, the strands of the braided shield 4 might not have enough distance to fully expand away from the wires. As such the shield bunch 188 may be formed in a manner that does not allow for proper tearing when the cable is retracted. This could lead to an incomplete or damaged shield trim or undesired tearing effect.

If the strip length (length of untrimmed exposed shield) is long, the shield gripper 178 might not make adequate contact to fully grip the shield 4. This can be mitigated by gripping closer to the end of the cable 10, where the shield 4 tends to be "looser" and easier to slide over the wires. The longer the strip length, the longer the length of exposed shielding. This means that the contact surface area between the shield 4 and the wires 6, 8 is increased, which requires a larger force in order to move or slide the shield 4. The closer the shield gripper 178 is to the cable tip 10*b*, the less length of exposed shielding is required to be "pulled" over the wires 6 and 8, thereby reducing the amount of force needed to cause the shield 4 to slide over the wires 6 and 8.

Since shield gripper 178 has to be compliant and "light" enough to move the shield braid without gripping the wires 6 and 8, it is much easier to bunch the shield 4 once the shield has lifted slightly off of the wires (begins bunching). The only portion of the shield 4 that is able to be "bunched" is the shield portion that exists between the shield gripper 178 and the edge 2*b* of the cable jacket 2; if it is possible to maximize that portion of the shield, it will be easier to slide the shield 4 over the wires 6 and 8. In some situations wherein the shield is difficult to bunch due to a longer strip length, the difficulty may be overcome by moving both the shield gripper 178 and the second press die 186 further towards the cable tip 10*b*.

In accordance with one implementation, the shield gripper 178 is bolted to the second press die 186. So, if the grip point is to move closer to the cable tip 10*b*, the second press die 186 would likewise have to move with the shield gripper 178. Preferably the shield gripper 178 and second press die 186 move together (or remain as close as possible) to ensure that the shield 4 only bunches between the first and second press dies 184 and 186, and not between the shield gripper 178 and second press die 186 (in a case where the shield gripper 178 moved closer to the cable tip 10*b* independently of the second press die 186).

Figure 13:
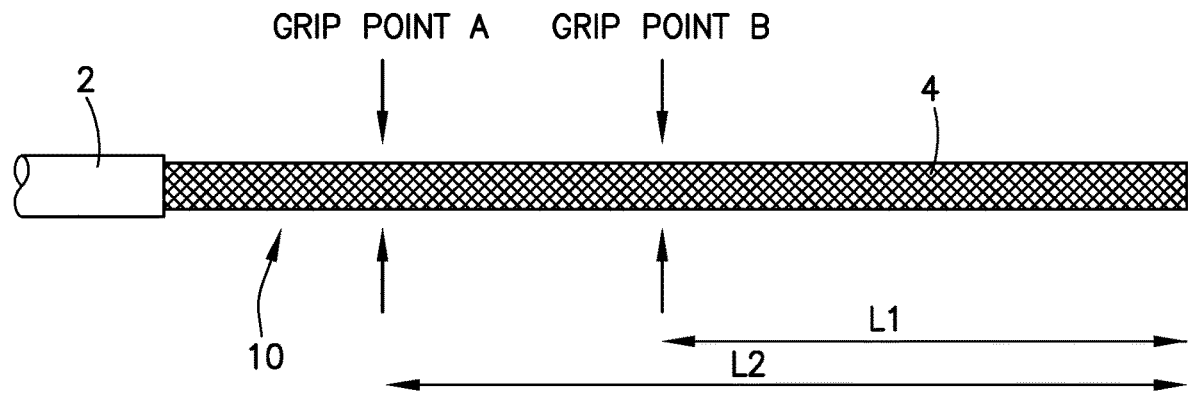
FIG. 13 is a diagram showing an unjacketed portion of a cable having a length of exposed shield and two example grip points.

The foregoing principle is illustrated in FIG. 13, which shows an unjacketed portion of a cable 10 having a length of exposed shield 4. Two grip points A and B are indicated respective pairs of opposing vertical arrows. The length of shield 4 to pull using grip point B is indicated by length L1; the length of shield 4 to pull using grip point A is indicated by length L2. The longer the length of the shield 4 that has to be pulled forward during the shield trim process, the more the shield 4 will resist movement. Grip point B reduces this length and resistance relative to the same parameters for grip point A. In summary, grip point B "pushes" more of the shield 4 and "pulls" less of the shield 4 in comparison to grip point A.

If the shield gripper 178 is wide enough (makes enough contact with the shield 4) and/or exerts enough gripping force to effectively move the shield 4 independent of strip length, the distance that the second press die 186 moves during shield bunching stroke may be a fixed value for cables of different sizes.

Figure 14:
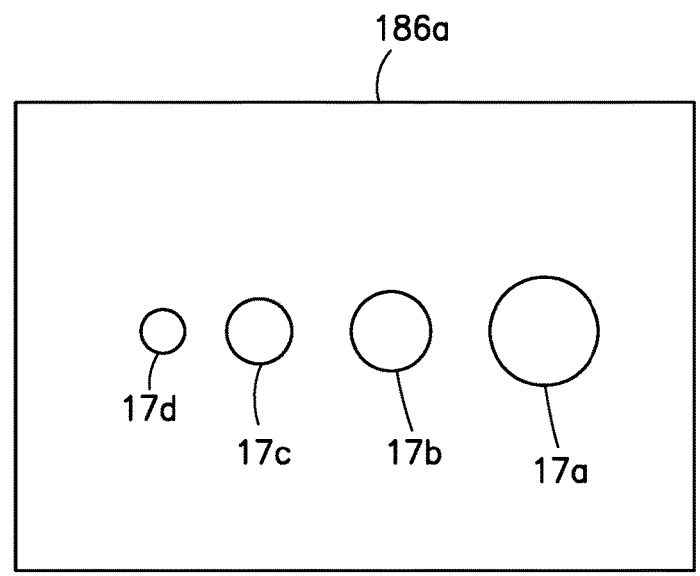
FIG. 14 is a diagram showing a front view of a second press die designed to provide such multi-diameter processing.

Optionally the apparatus disclosed above may include additional advantageous features. As previously mentioned, a single apparatus having press dies with multiple different-sized holes may be used to trim shields of different-sized cables. FIG. 14 is a diagram showing a front view of a second press die 186*a* designed to provide such multi-diameter processing. The second press die 186*a* has four holes 17*a*-17*d* of different diameters to accommodate multiple types and sizes of cables. In this example, the holes 17*a*-17*d* in the second press die 186 seen in FIG. 14 may be aligned with the holes 17*a*-17*d* in the first press die 184 seen in FIG. 8. The holes 17*a*-17*d* could be positioned horizontally (as shown in FIG. 14) or vertically (not shown in the drawings) or any other desired direction. FIG. 8 also shows the different size holes arranged linearly; however, in other embodiments, the different size holes arrangement could follow a desired pattern that is not linear, such as circular, for example.

In the case where the shield trimming apparatus 45 depicted in FIG. 6 is set up at a workstation in an automated production line of the type depicted in FIG. 1, the end 10*a* of the cable 10 may be fed by a drive wheel 16 first into a funnel 22 (see FIG. 3) and then into the hole 194 of the first press die 184 (see FIG. 6). Alternatively, the shield trimming apparatus 45 disclosed herein may be configured as bench-top equipment, in which case the unjacketed end 10*a* of the cable 10 may be fed to the correct entry point manually.

Moreover, the first and second press dies 184 and 186 may have confronting surfaces 185 and 187 which differ from what is depicted in FIG. 6 or FIG. 10. More specifically, first and second press dies 184 and 186 may have various additional machined features to facilitate tearing of the pinched shield at the hole edge 194*c* of the first press die 184.

Figure 15:
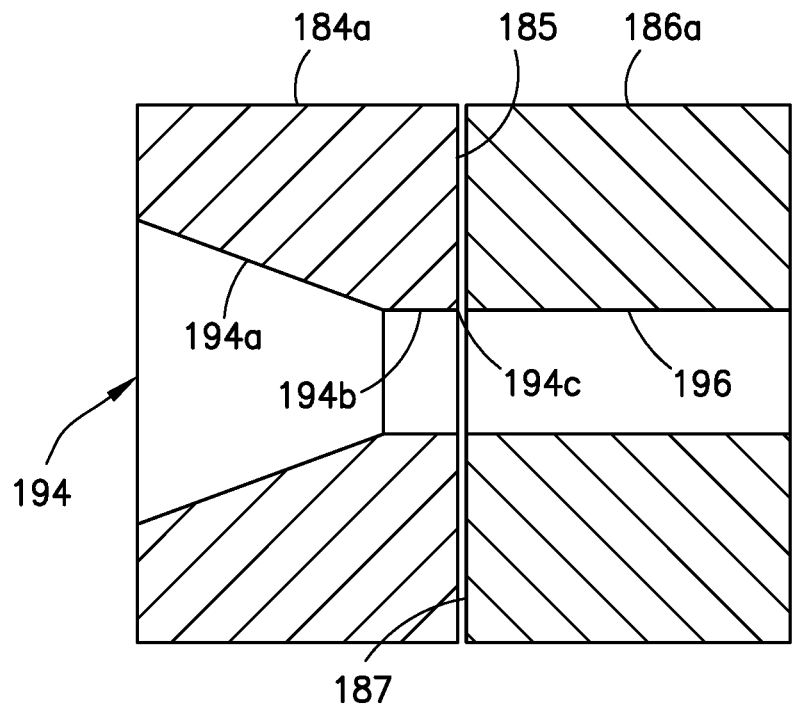
FIGS. 15 through 18 are diagrams showing sectional views of respective sets of press dies having confronting surfaces with different machined features designed to aid in the tearing of the braided shield.

FIG. 15 is a diagram showing a sectional view of a first press die 184*a* and a second press die 186*a* having respective confronting surfaces 185 and 187 which are planar and perpendicular to the axis of the bore formed by holes 194 and 196.

Figure 16:
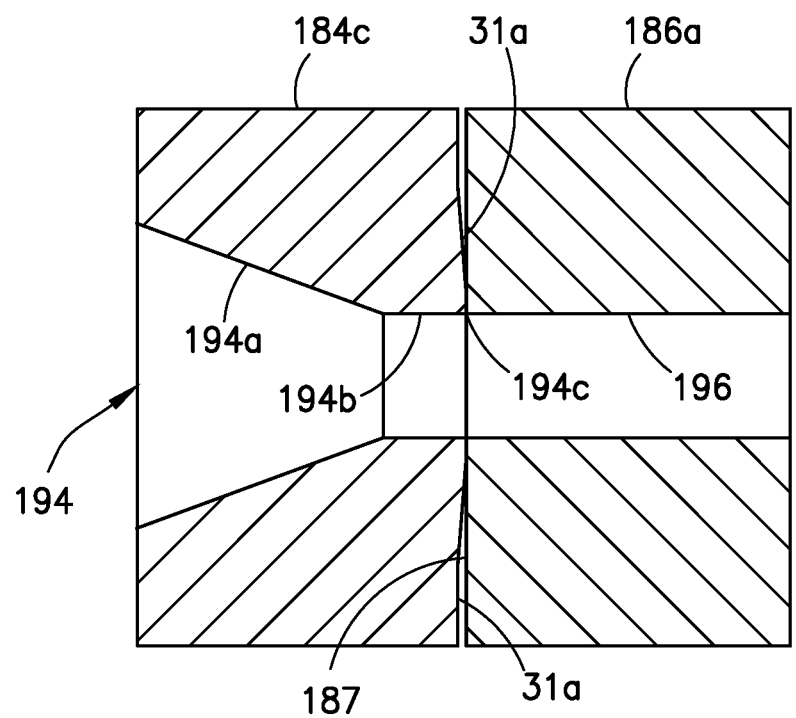

FIG. 16 is a diagram showing a sectional view of the same second press die 186*a* as is seen in FIG. 15, but the first press die 184*c* has a confronting chamfered surface 31*a* that has a radially outwardly extending chamfer. That chamfer reduces the area of contact between the confronting surfaces of the press dies, thereby concentrating the force in the area surrounding the hole edge 194*c* that contacts bunched exposed shield portion 4*d* (not shown in FIG. 16, but see shield bunch 188 in FIG. 12) of the shield 4.

Figure 17:
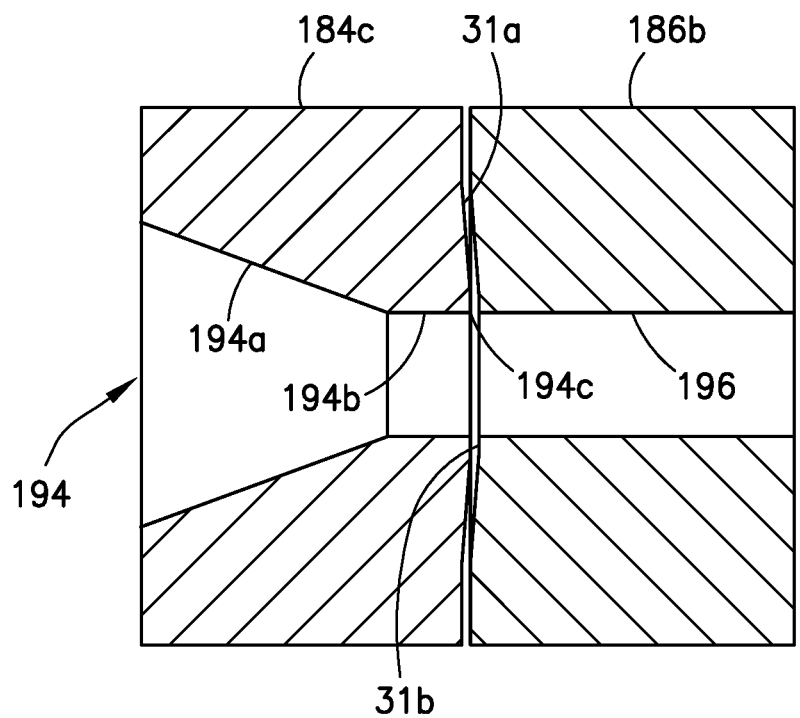

FIG. 17 is a diagram showing a sectional view of the same first press die 184*c* having the chamfered surface 31*a* as is seen in FIG. 16, but a second press die 186*b* has a confronting chamfered surface 31*b* that has a radially inwardly extending chamfer. This configuration may have the effect of creating a greater resistance to the bunched portion 4*b* (not shown in FIG. 16, but see FIG. 12) of the shield 4 moving axially in the direction in which the cable 10 is pulled.

Figure 18:
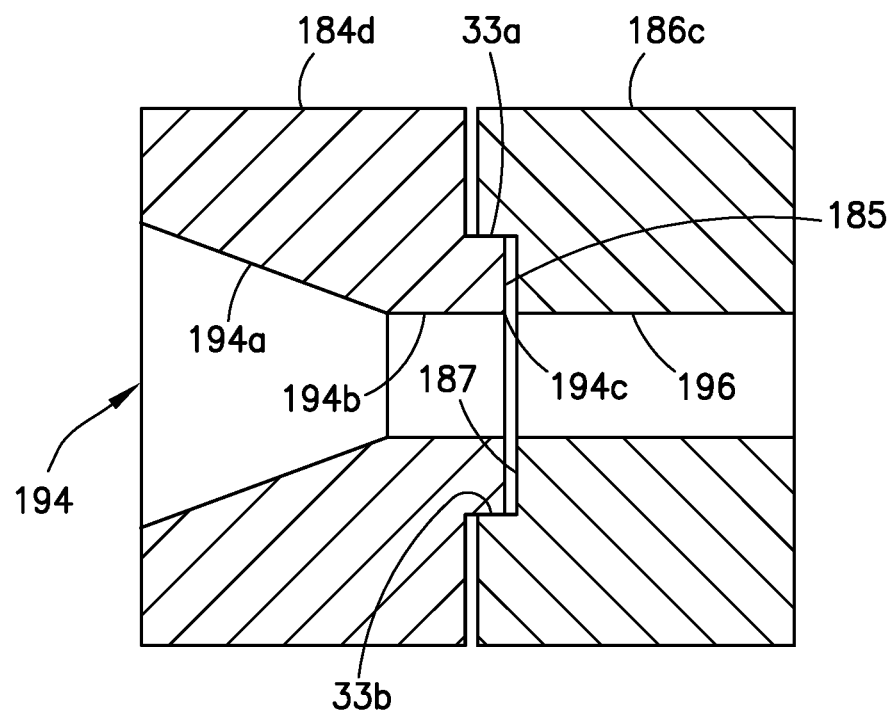

FIG. 18 is a diagram showing a sectional view of a first press die 184*d* having an outer circumferential edge 33*a* and a second press die 186*c* having an inner circumferential edge 33*b* that surrounds and confronts outer circumferential edge 33*a*. For example, the outer circumferential edge 33*a* and the inner circumferential edge 33*b* may be circular, the outer diameter of the former being slightly smaller than the inner diameter of the latter. The corner formed by the outer and inner circumferential edges 33*a* and 33*b* add extra grip on the bunched shield strands to prevent them from pulling out from the grip friction between the surfaces 185 and 187 while pulling out the cable 10.

Figure 19A:
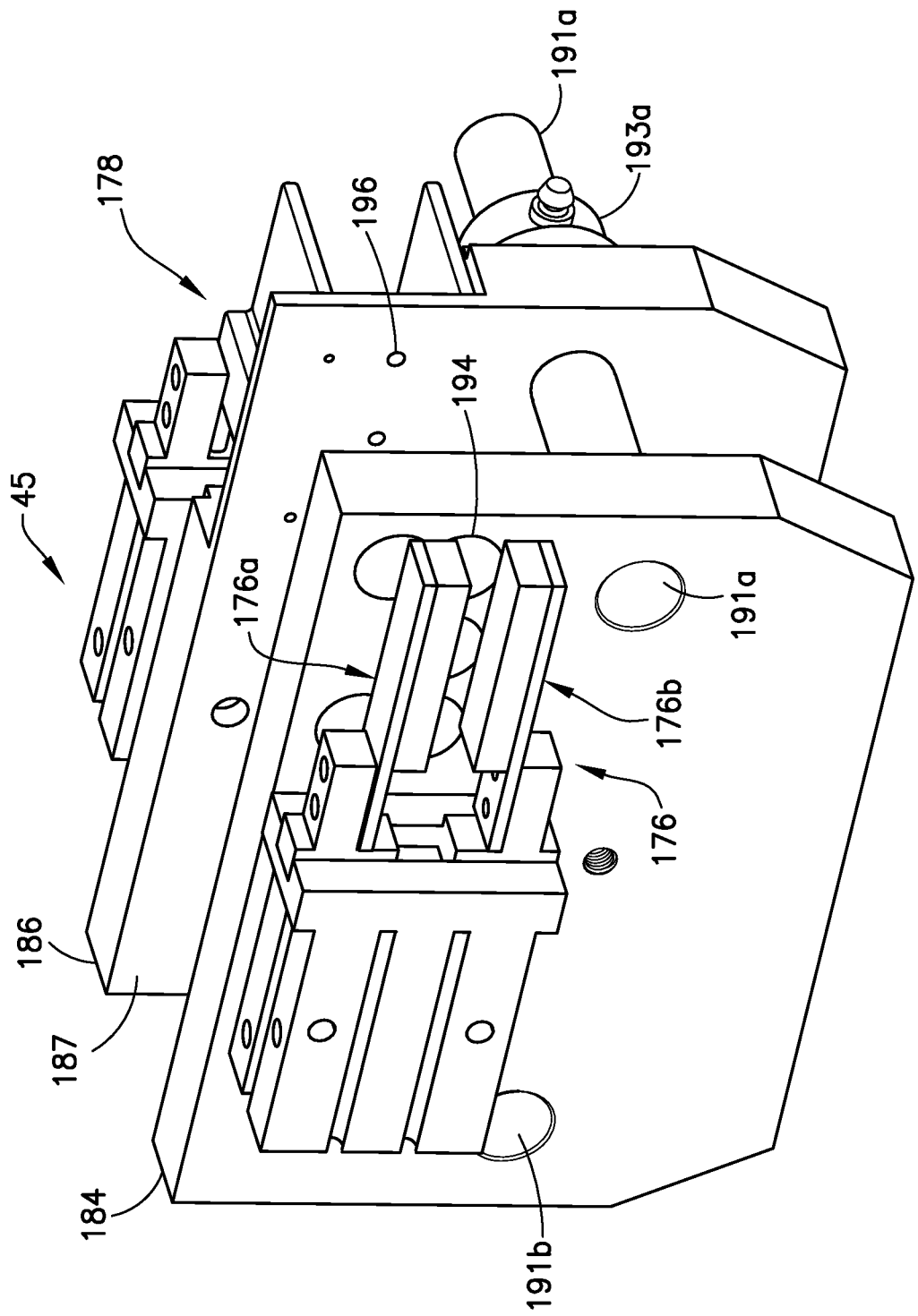

FIGS. 19A and 19B are diagrams representing respective three-dimensional front and rear views of a shield trimming apparatus 45 for automated trimming of exposed shield from the end of a shielded cable in accordance with one proposed implementation. As seen in FIG. 19A, the shield trimming apparatus 45 includes a first press die 184 and a second press die 186. The second press die 186 is slidably coupled to a pair of mutually parallel shafts 191*a* and 191*b*. Respective ends of shafts 191*a* and 191*b* are affixed inside respective holes formed in the first press die 184. As best seen in FIG. 19B, a pair of bushings 193*a* and 193*b* are slidably coupled to the shafts 191*a* and 191*b* respectively and are fixedly coupled to the second press die 186, which arrangement enables the second press die 186 to slide back and forth along the shafts 191*a* and 191*b* while the first press die 184 is stationary. For example, the second press die 186 slides on shafts 191*a* and 191*b* in a direction toward the first press die 184 during the shield bunching stroke. In accordance with one proposed implementation, the second press die 186 is attached to the end of a piston (not shown in FIG. 19B) of a double-acting pneumatic cylinder, which extends when the cylinder is actuated to cause the second press die 186 and shield gripper 178 mounted thereto to pull shield portions 4*b* and 4*c* (see FIG. 6) toward the first press die 184.

As seen in FIG. 19A, a cable gripper 176 is affixed to the entry side of the first press die 184. The cable gripper 176 includes a pair of cable gripper fingers 176*a* and 176*b*. The cable gripper fingers 176*a* and 176*b* are translatable in opposite directions to open or close the cable gripper 176. The first press die 184 has a multiplicity of holes for receiving cables of different diameters, including a hole 194.

As seen in FIG. 19B, a shield gripper 178 is affixed to the exit side of the second press die 186. The shield gripper 178 includes a pair of shield gripper fingers 178*a* and 178*b*. The shield gripper fingers 178*a* and 178*b* are translatable in opposite directions to open or close the shield gripper 178. The second press die 186 also has a multiplicity of holes for receiving unjacketed cables of different diameters, including a hole 196.

FIGS. 20A through 20J are diagrams representing respective side views of the apparatus depicted in FIGS. 19A and 19B at ten stages in an automated shield trimming operation. In accordance with one embodiment, the cable gripper 176, shield gripper 178 and second press die 186 are actuated using double-acting pneumatic cylinders, such as pneumatic cylinders 84, 86 and 88 operating under the control of a computer 162 as depicted in FIG. 5. It should be appreciated, however, that the same components could be actuated using electric motors that drive rotation of respective gear trains or lead screws. For the sake of illustration, the following description will assume that second press die 186 is connected to a piston (not shown in FIGS. 20A-20J), which piston is a component of the pneumatic cylinder 82 identified in FIG. 5, while the cable gripper 176 and shield gripper 178 are respectively coupled to pistons of respective pneumatic cylinders 84 and 86 identified in FIG. 5.

Figure 20A:
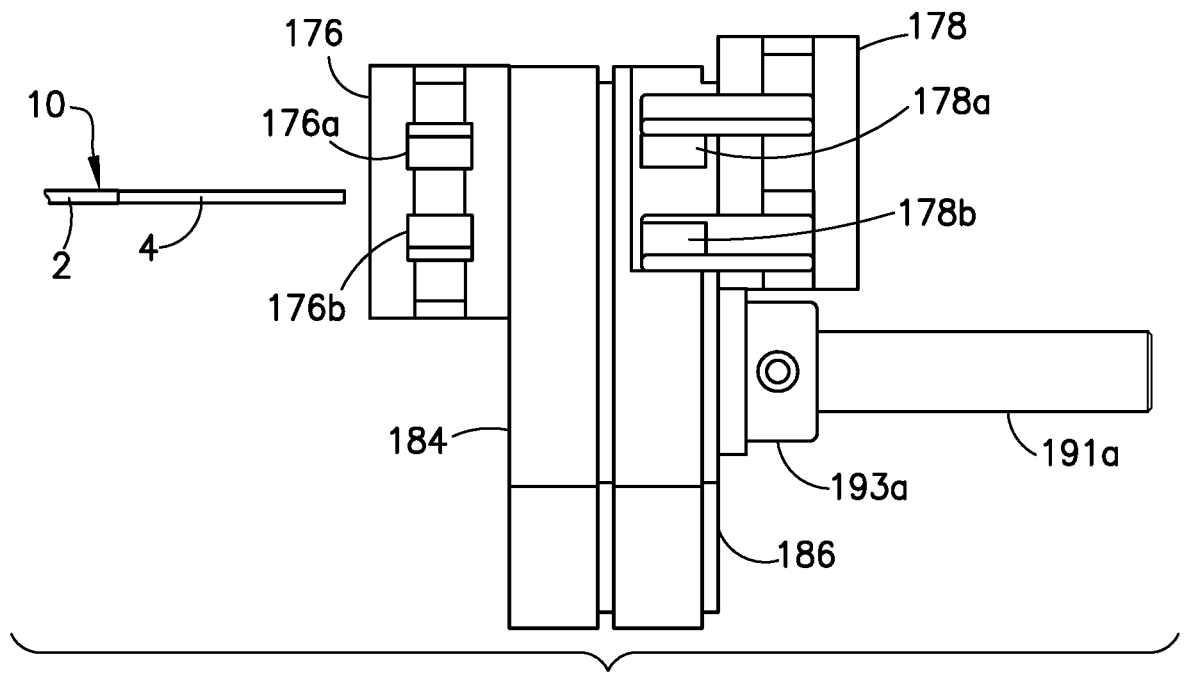
FIGS. 20A through 20J are diagrams representing respective side views of the apparatus depicted in FIGS. 19A and 19B at ten stages in an automated shield trimming operation.

In the stage depicted in FIG. 20A, the piston of the pneumatic cylinder 82 (see FIG. 5) is extended so that the second press die 186 is in contact with first press die 184. Cable gripper 176 and shield gripper 178 are both actuated in the open position, meaning that the pistons of pneumatic cylinders 84 and 86 (see FIG. 5) are both retracted.

Figure 20B:
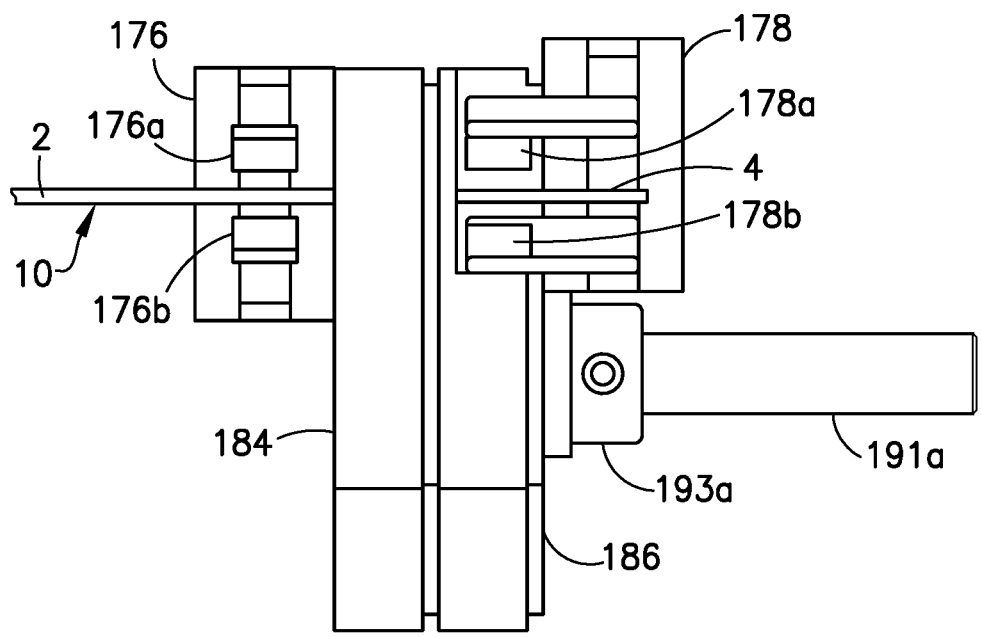

In the next stage depicted in FIG. 20B, an unjacketed end of a shielded cable 10 is inserted through first press die 184 and second press die 186 using the through-hole that is most appropriately sized for the cable.

Figure 20C:
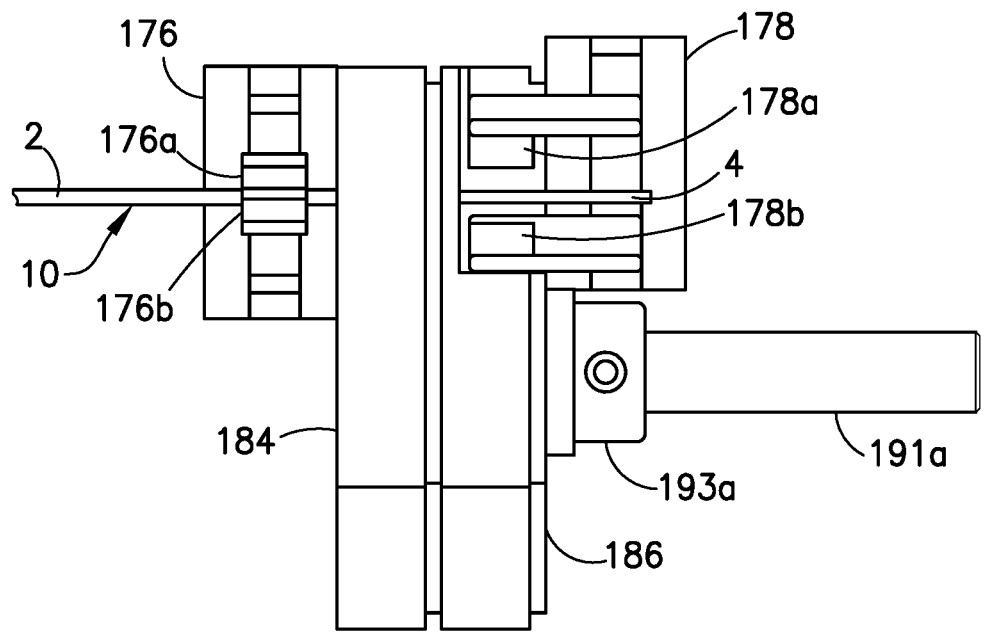

Once the cable is fully inserted, i.e., such that the shield is in the optimal position for processing, the cable gripper 176 actuates closed (e.g., the piston of pneumatic cylinder 84 in FIG. 5 is extended) to brace the cable 10 and hold it stationary. FIG. 20C shows the cable gripper 176 in a closed state while the shield gripper 178 remains in an open state.

Figure 20D:
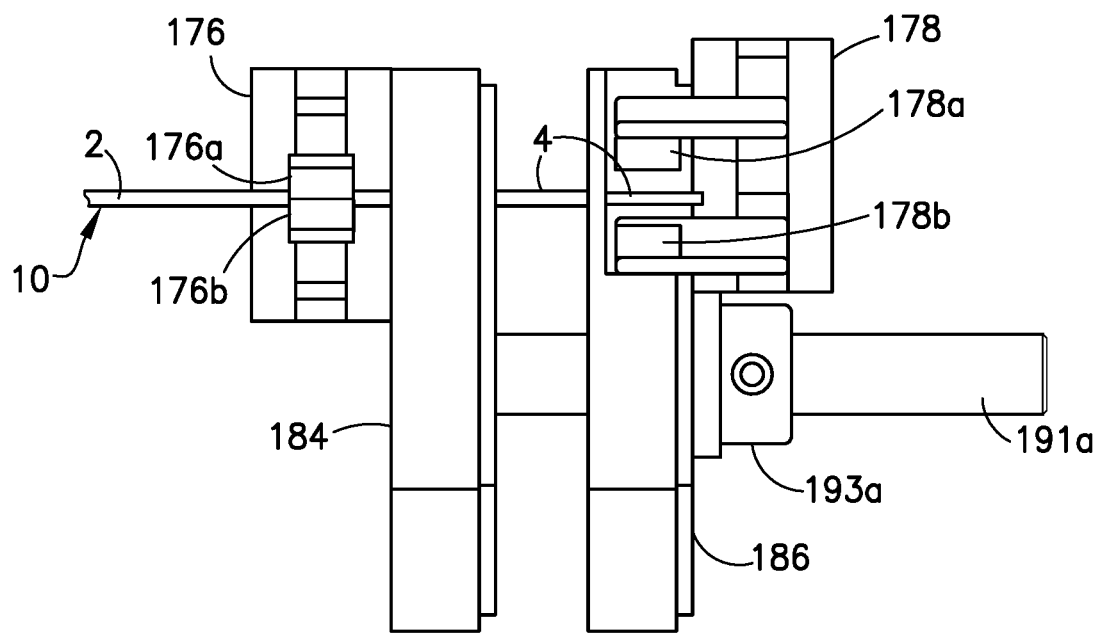

In the next stage depicted in FIG. 20D, the piston of the pneumatic cylinder 82 (see FIG. 5) is retracted, pulling the second press die 186 (and the open shield gripper 178) away from first press die 184. A portion of the shield 4 is visible in the space between the first and second press dies 184 and 186.

Figure 20E:
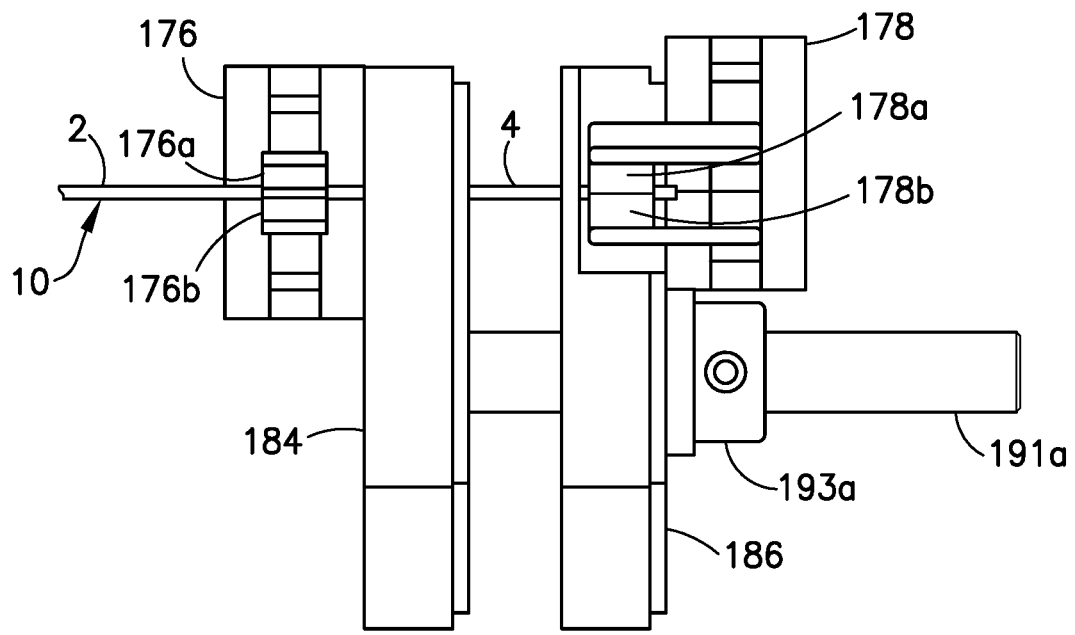

In the next stage, the shield gripper 178 actuates closed (e.g., the piston of pneumatic cylinder 86 in FIG. 5 is extended) and grips the exposed shield 4 of the cable 10. This stage of the shield trimming procedure is depicted in FIG. 20E.

Figure 20F:
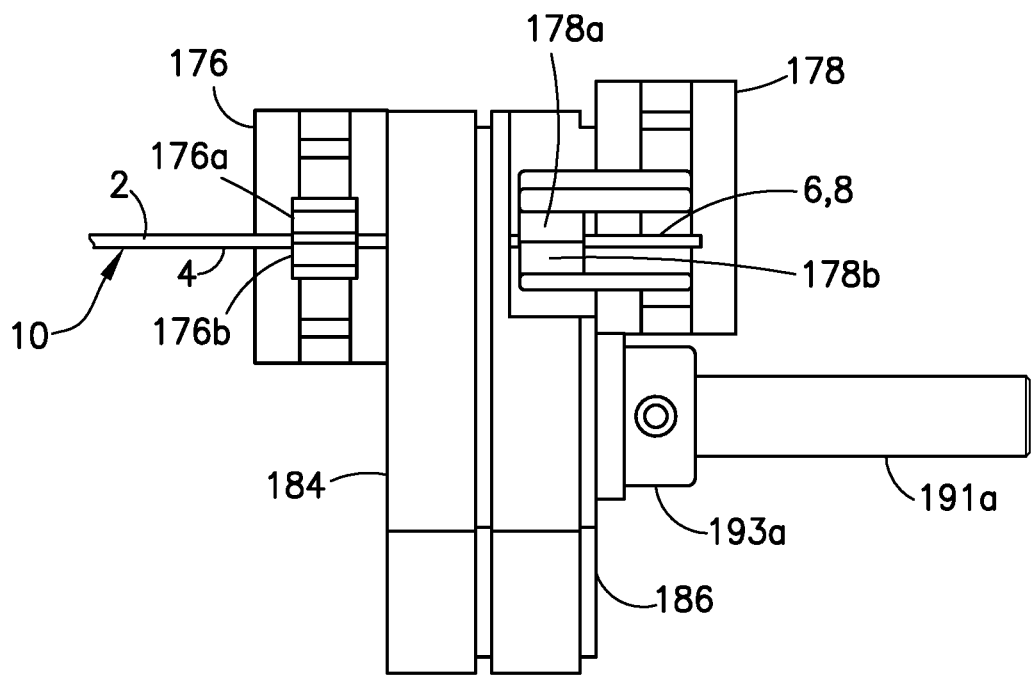

The piston of the pneumatic cylinder 82 (see FIG. 5) is then extended, pushing the second press die 186 forward towards the first press die 184 as depicted in FIG. 20F. This action causes the "bunching" (not visible in FIG. 20F) of the shield 4 between the first and second press dies 184 and 186. The bunched portion of the shield 4 is pinched between the confronting surfaces of the first and second press dies 184 and 186 as the piston extends fully.

Figure 20G:
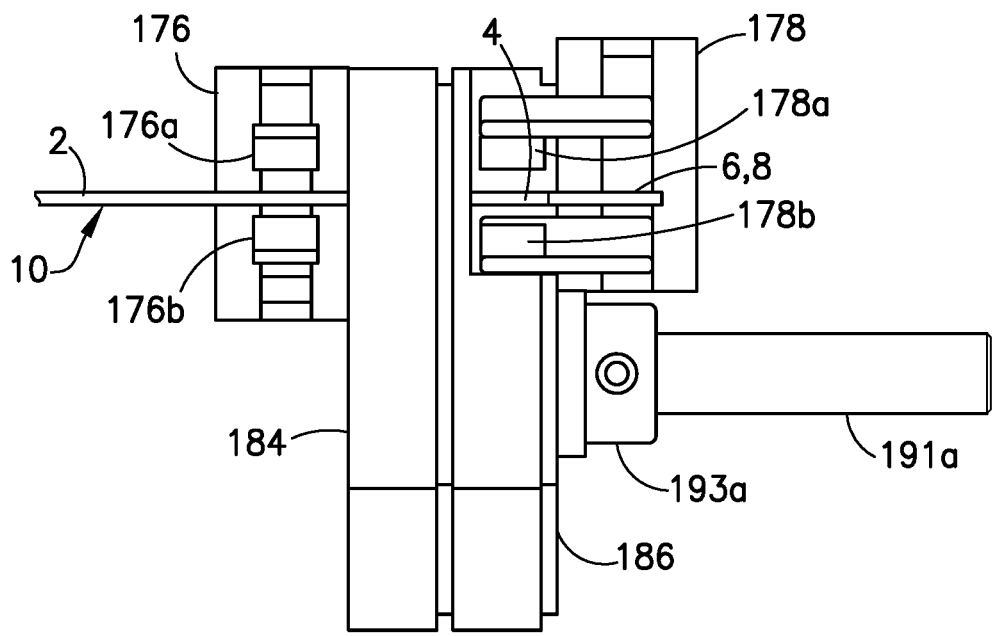
Figure 20H:
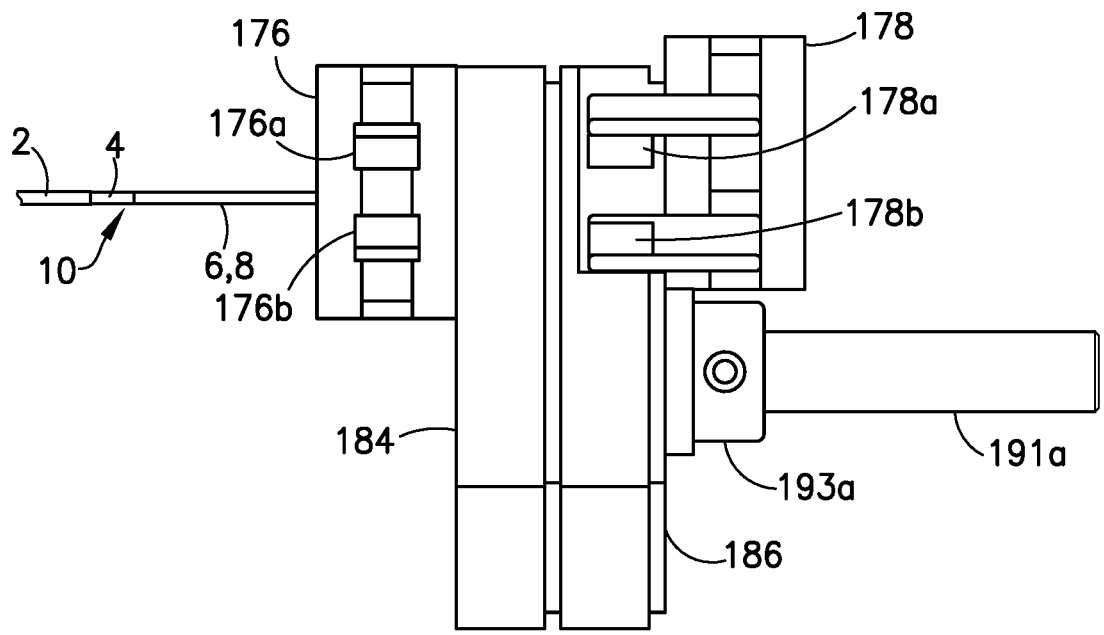

In the next stage, in one embodiment, the cable gripper 176 and shield gripper 178 both actuate open (e.g., the pistons of pneumatic cylinders 84 and 86 in FIG. 5 are retracted), releasing the cable 10. This stage of the shield trimming procedure is depicted in FIG. 20G. The cable 10 is then removed from the apparatus, either manually by an operator, or by an additional pneumatic actuator that grips the cable 10 and pulls it out of the press dies. FIG. 20H depicts the cable 10 not yet completely removed from the first press die 184. The pulling of the cable 10 is what performs the shield trim; the strands of the braided shield 4 are pulled circumferentially against the hole edge 194*c* (see FIG. 12), and the resulting stress causes the shield strands to break at that point as the cable 10 is removed.

In another embodiment, and in a more automated operation, cable gripper 176 remains closed and gripping the cable 10 while shield gripper 178 is actuated open. Cable gripper 176 is then moved in a direction that retracts the cable 10, thus causing the exposed shield portion 4*a* to be torn as previously described.

Figure 20I:
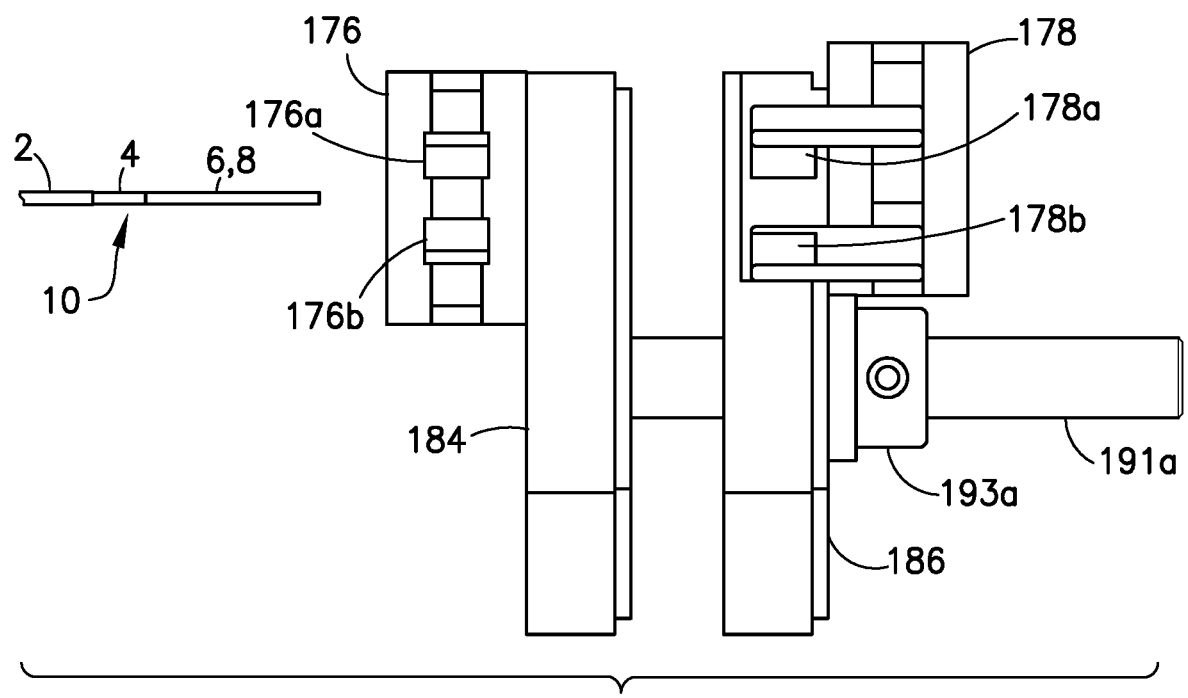

Once the cable has been removed from the device, the piston of the pneumatic cylinder 82 (see FIG. 5) is retracted, pulling second press die 186 away from the first press die 184 as depicted in FIG. 20I. The remaining shield debris is removed from the apparatus, either by using an air blast, air suction, manual removal, a pneumatic gripper to pull out the shield strands from the rear side of the second press die 186, or some combination of the aforementioned solutions.

Figure 20J:
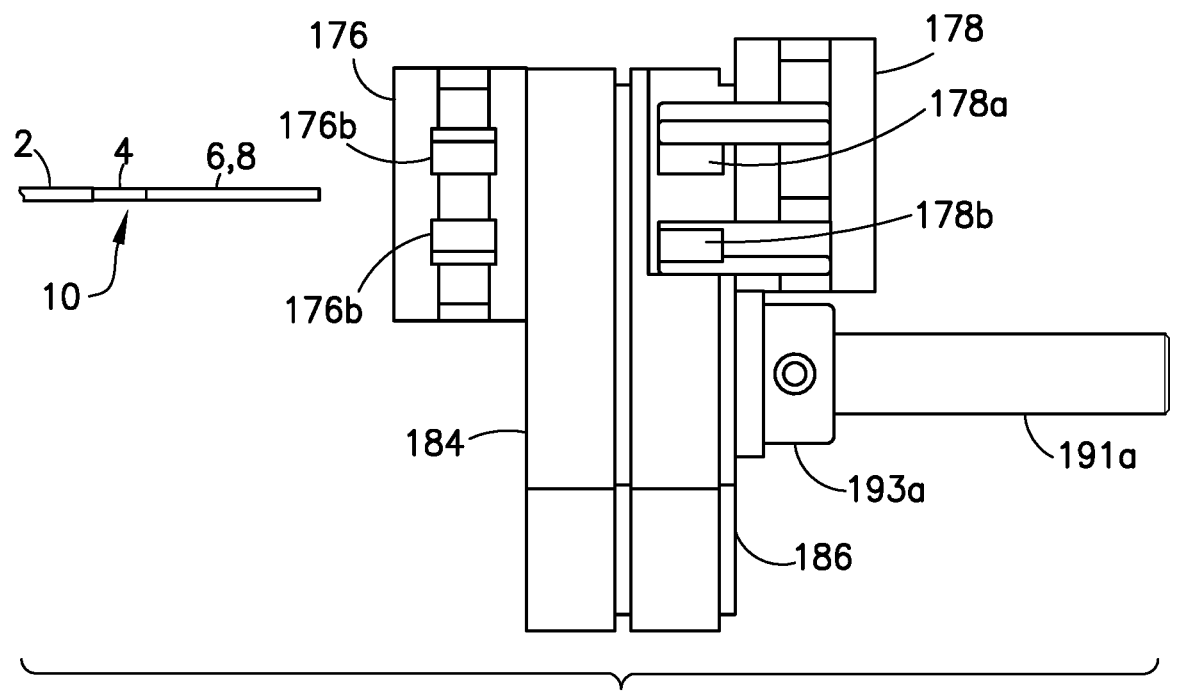

Once all remaining shield strands have been removed, the apparatus is optionally reset to be ready for the next cable to be processed, wherein the press die 186 and 184 are pushed towards and in contact with each other. In one embodiment, this is achieved again by extending the piston of the pneumatic cylinder 82 (see FIG. 5) so that the second press die 186 is pushed toward and makes contact with the first press die 184 as depicted in FIG. 20J.

The systems, methods and apparatus disclosed above may be employed in an aircraft manufacturing or maintenance method. During production, component and subassembly manufacturing and system integration of the aircraft takes place. While in service by a customer, the aircraft is scheduled for routine maintenance (which may also include modification, reconfiguration, refurbishment, and so on).

The cable processing methods disclosed herein may be performed or carried out by a system integrator, a third party, and/or an operator (e.g., a customer). For the purposes of this description, a system integrator may include without limitation any number of aircraft manufacturers and majorsystem subcontractors; a third party may include without limitation any number of venders, subcontractors, and suppliers; and an operator may be an airline, leasing company, military entity, service organization, and so on.

The aircraft may include an airframe (comprising, e.g., a fuselage, frames, stiffeners, wing boxes, etc.) with a plurality of systems and an interior. Examples of high-level systems include one or more of the following: a propulsion system, an electrical system, a hydraulic system, and an environmental control system. Any number of other systems having cables may be included. Although an aerospace example is shown, the principles disclosed herein may be applied to other industries, such as the automotive industry.

Apparatus and methods embodied herein may be employed during any one or more of the stages of production or maintenance. For example, cable components or subassemblies may be fabricated and/or assembled during the production process or during maintenance. Also, one or more apparatus embodiments, method embodiments, or a combination thereof may be utilized during the production stages to substantially expedite assembly of or reduce the cost of an aircraft. Similarly, one or more of apparatus embodiments, method embodiments, or a combination thereof may be utilized while the aircraft is in service, for example and without limitation, during maintenance or retrofitting operations.

While methods and apparatus for trimming the shield on an unjacketed portion of a shielded cable have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

The embodiments disclosed above use one or more computer systems. As used in the claims, the term "computer system" comprises a single processing or computing device or multiple processing or computing devices that communicate via wireline and/or wireless connections or via one or more local-area and/or wide-area networks (e.g., the Internet). Such processing or computing devices typically include one or more of the following: a processor, a controller, a central processing unit, a microcontroller, a reduced instruction set computer processor, an application-specific integrated circuit, a programmable logic circuit, a field-programmable gated array, a digital signal processor, and/or any other circuit or processing device capable of executing the functions described herein. The above examples are exemplary only, and thus are not intended to limit in any way the definition and/or meaning of the term "computer system".

The methods described herein may be encoded as executable instructions embodied in a non-transitory tangible computer-readable storage medium, including, without limitation, a storage device and/or a memory device. Such instructions, when executed by a processing or computing system, cause the system device to perform at least a portion of the methods described herein.

The process claims set forth hereinafter should not be construed to require that the steps recited therein be performed in alphabetical order (any alphabetical ordering in the claims is used solely for the purpose of referencing previously recited steps) or in the order in which they are recited unless the claim language explicitly specifies or states conditions indicating a particular order in which some or all of those steps are performed. Nor should the process claims be construed to exclude any portions of two or more steps being performed concurrently or alternatingly unless the claim language explicitly states a condition that precludes such an interpretation.

The invention claimed is:

1. A method for trimming a braided shield in an unjacketed portion of a cable, the braided shield having first and second exposed shield portions connected by a third exposed shield portion, the method comprising:
   placing the first exposed shield portion inside a first hole in a first plate having a hole edge;
   placing the second exposed shield portion inside a second hole in a second plate;
   moving the second exposed shield portion toward the first exposed shield portion in a manner that causes the third exposed shield portion to bunch radially outward around an entire periphery of the braided shield; and
   disconnecting the third exposed shield portion from the first exposed shield portion using the hole edge of the first hole while the third exposed shield portion is bunched radially outward and the second exposed shield portion is not moving toward the first exposed shield portion,
   wherein said disconnecting the third exposed shield portion from the first exposed shield portion comprises tearing strands of the braided shield.

2. The method as recited in claim 1, further comprising moving the second hole toward the first hole during said moving the second exposed shield portion toward the first exposed shield portion.

3. The method as recited in claim 1, further comprising pinching the third exposed shield portion which is bunched radially outward.

4. The method as recited in claim 3, further comprising moving the first exposed shield portion away from the second exposed shield portion while the third exposed shield portion is being pinched.

5. The method as recited in claim 4, wherein said moving the first exposed shield portion away from the second exposed shield portion comprises rotating a pair of wheels in a cable pulling direction while a jacketed portion of the cable is disposed in a nip between the pair of wheels.

6. The method as recited in claim 4, further comprising gripping a jacketed portion of the cable between opposed cable gripper fingers of a cable gripper, wherein the cable gripper fingers do not move during said moving the second exposed shield portion toward the first exposed shield portion.

7. The method as recited in claim 3, wherein said pinching comprises pressing the third exposed shield portion against a surface surrounding and adjacent to the hole edge.

8. The method as recited in claim 1, wherein the hole edge and the shield are made of metal.

9. The method as recited in claim 1, wherein the first hole comprises a circular cylindrical section and the second hole comprises a circular cylindrical bore which is aligned with the circular cylindrical section of the first hole.

10. The method as recited in claim 1, wherein the cable comprises multiple wires having respective portions surrounded by the braided shield.

11. A method for trimming a shield in an unjacketed portion of a cable, the shield having first and second exposed shield portions connected by a third exposed shield portion, the method comprising:

placing the first exposed shield portion inside a first hole having a hole edge;

placing the second exposed shield portion inside a second hole;

moving the second exposed shield portion toward the first exposed shield portion in a manner that causes the third exposed shield portion to bunch radially outward around an entire periphery of the shield;

disconnecting the third exposed shield portion from the first exposed shield portion using the hole edge of the first hole while the third exposed shield portion is bunched radially outward and the second exposed shield portion is not moving toward the first exposed shield portion;

moving the first exposed shield portion away from the second exposed shield portion while the third exposed shield portion is being pinched; and gripping a jacketed portion of the cable between opposed cable gripper fingers of a cable gripper by closing the cable gripper fingers, wherein the cable gripper fingers do not move during moving the second exposed shield portion toward the first exposed shield portion.

12. The method as recited in claim 11, further comprising gripping a fourth exposed shield portion of the shield between opposed shield gripper fingers of a shield gripper by closing the shield gripper fingers, wherein the shield gripper fingers move toward the cable gripper fingers during said moving the second exposed shield portion toward the first exposed shield portion, wherein the second exposed shield portion is disposed between the third and fourth exposed shield portions.

13. The method as recited in claim 12, further comprising opening the cable gripper fingers and opening the shield gripper fingers, wherein moving the first exposed shield portion away from the second exposed shield portion occurs while the cable gripper and shield gripper are open.

14. A method for trimming a shield of a shielded cable, comprising:
(a) placing an unjacketed portion of a shielded cable so that an exposed shield passes through a first hole that intersects a first surface at a hole edge and through a second hole that intersects a second surface that confronts the first surface, such that the unjacketed portion projects out of the second hole;
(b) after completion of step (a), gripping a jacketed portion of the shielded cable;
(c) moving the second hole away from the first hole while the gripped jacketed portion does not move;
(d) after completion of step (c), gripping a portion of the exposed shield that projects out of the second hole;
(e) while the gripped jacketed portion of the shielded cable is stationary, pinching the exposed shield portion by moving the gripped portion of the exposed shield in a first direction until a bunched portion of the exposed shield is pinched between the first and second surfaces;
(f) after completion of step (e) and while the bunched portion of the exposed shield is pinched between the first and second surfaces, moving the jacketed portion of the shielded cable in the first direction so that a ire portion of the exposed shield that was inside the first hole tears away along the hole edge from the bunched portion of the shield.

15. The method as recited in claim 14, wherein said pinching comprises pressing the bunched portion of the exposed shield against a portion of the first surface surrounding and adjacent to the hole edge.

16. The method as recited in claim 14, wherein said moving the jacketed portion of the shielded cable in the first direction in step (f) comprises rotating a pair of wheels in a cable pulling direction while the jacketed portion of the cable is disposed in a nip between the pair of wheels.

17. The method as recited in claim 14, wherein step (b) comprises gripping the jacketed portion of the shielded cable between opposed cable gripper fingers of a cable gripper by closing the opposed cable gripper fingers, which cable gripper fingers do not move during step (e).

18. The method as recited in claim 17, wherein step (d) comprises gripping the portion of the exposed shield that projects out of the second hole between opposed shield gripper fingers of a shield gripper by closing the opposed shield gripper fingers, and wherein the shield gripper fingers move toward the cable gripper fingers during step (e).

19. The method as recited in claim 18, further comprising opening the cable gripper fingers and opening the shield gripper fingers, wherein moving the jacketed portion of the shielded cable in the first direction occurs while the cable gripper fingers and the shield gripper fingers are open.

20. The method as recited in claim 14, wherein the hole edge and the shield are made of metal.

21. The method as recited in claim 14, wherein the shield is a braided shield comprising strands which are torn during step (f).

\* \* \* \* \*